US009798061B2

(12) United States Patent
Hsiao et al.

(10) Patent No.: US 9,798,061 B2
(45) Date of Patent: Oct. 24, 2017

(54) HYBRID LIGHT GUIDE PLATE AND DISPLAY DEVICE

(71) Applicants: Chun-Chung Hsiao, Hsin-Chu (TW);
Shih-Chang Chen, Hsin-Chu (TW);
Cheng-Tsung Li, Hsin-Chu (TW);
Tzeng-Ke Shiau, Hsin-Chu (TW)

(72) Inventors: Chun-Chung Hsiao, Hsin-Chu (TW);
Shih-Chang Chen, Hsin-Chu (TW);
Cheng-Tsung Li, Hsin-Chu (TW);
Tzeng-Ke Shiau, Hsin-Chu (TW)

(73) Assignee: YOUNG LIGHTING TECHNOLOGY INC., Hsin-Chu (TW)

( * ) Notice: Subject to any disclaimer, the term of this patent is extended or adjusted under 35 U.S.C. 154(b) by 582 days.

(21) Appl. No.: 13/951,468

(22) Filed: Jul. 26, 2013

(65) Prior Publication Data
US 2014/0029295 A1 Jan. 30, 2014

(30) Foreign Application Priority Data

Jul. 26, 2012 (TW) .............................. 101127063 A
Apr. 22, 2013 (TW) .............................. 102114199 A
Jul. 15, 2013 (TW) .............................. 102125254 A

(51) Int. Cl.
*F21V 7/04* (2006.01)
*F21V 8/00* (2006.01)
(Continued)

(52) U.S. Cl.
CPC .......... *G02B 6/0011* (2013.01); *G02B 6/0088* (2013.01); *G02F 1/133308* (2013.01);
(Continued)

(58) Field of Classification Search
CPC .. G02B 6/0076; G02B 6/0011; G02B 6/0088; G02B 6/0045; G02B 6/005;
(Continued)

(56) References Cited

U.S. PATENT DOCUMENTS

2006/0256583 A1* 11/2006 Shimizu ............... G02B 6/0071
362/633
2011/0001901 A1* 1/2011 Solomon ............. G02B 6/0063
349/65
(Continued)

FOREIGN PATENT DOCUMENTS

CN 1492269 4/2004
CN 1497309 5/2004
(Continued)

OTHER PUBLICATIONS

Machine translation of Chen et al., TW 201039022, Pub. Nov. 1, 2010.*
(Continued)

*Primary Examiner* — Peggy Neils
*Assistant Examiner* — William N Harris
(74) *Attorney, Agent, or Firm* — JCIPRNET

(57) ABSTRACT

A display device includes a housing, a frame bonded to the housing, and a display module. The display module includes a back cover bonded to the frame, a light guide plate (LGP), a support element, a display panel, and an optical film set. The LGP is supported on the back cover and has a light exiting surface and an opposite back surface. At least two sides of the LGP's back surface are adhered on the back cover, and the LGP is made of glass. The support element and display panel are supported respectively on the LGP and support element. The optical film set is between the display panel and LGP. A hybrid LGP includes a first light guide sub-plates and a second light guide sub-plate. The second
(Continued)

light guide sub-plate is stacked on and bonded to the first light guide sub-plate.

26 Claims, 19 Drawing Sheets

(51) Int. Cl.
   *G02F 1/1333* (2006.01)
   *G02F 1/1335* (2006.01)

(52) U.S. Cl.
   CPC ............ *G02B 6/005* (2013.01); *G02B 6/0043* (2013.01); *G02F 1/133615* (2013.01); *G02F 2001/133317* (2013.01)

(58) Field of Classification Search
   CPC ......... G02F 1/133308; G02F 1/133605; G02F 2001/133317
   See application file for complete search history.

(56) References Cited

U.S. PATENT DOCUMENTS

| | | | | |
|---|---|---|---|---|
| 2011/0227895 | A1* | 9/2011 | Takahashi | G02B 6/0061 345/211 |
| 2011/0242742 | A1* | 10/2011 | Kim | H04N 5/64 361/679.01 |
| 2012/0105765 | A1* | 5/2012 | Kawai | G02F 1/133605 349/62 |
| 2013/0016524 | A1* | 1/2013 | Momose | G02F 1/133308 362/602 |

FOREIGN PATENT DOCUMENTS

| | | |
|---|---|---|
| CN | 2785066 | 5/2006 |
| CN | 1885100 | 12/2006 |
| CN | 1936627 | 3/2007 |
| CN | 1997922 | 7/2007 |
| CN | 201138406 | 10/2008 |
| CN | 101344681 | 1/2009 |
| CN | 101464592 | 6/2009 |
| CN | 101825246 | 9/2010 |
| CN | 101936509 | 1/2011 |
| CN | 102089568 | 6/2011 |
| CN | 102117109 | 7/2011 |
| CN | 102269887 | 12/2011 |
| CN | 102338944 | 2/2012 |
| CN | 102354014 | 2/2012 |
| CN | 102374497 | 3/2012 |
| CN | 102506358 | 6/2012 |
| CN | 102915134 | 2/2013 |
| CN | 102981665 | 3/2013 |
| CN | 102998818 | 3/2013 |
| JP | H09-096800 | 4/1997 |
| JP | H09147618 | 6/1997 |
| JP | H10-161119 | 6/1998 |
| JP | 2000-206339 | 7/2000 |
| JP | 2000-314882 | 11/2000 |
| JP | 2001264758 | 9/2001 |
| JP | 2003-308718 | 10/2003 |
| JP | 2004-302117 | 10/2004 |
| JP | 2005-026101 | 1/2005 |
| JP | 2006-178135 | 7/2006 |
| JP | 2007-233251 | 9/2007 |
| JP | 2007-240689 | 9/2007 |
| JP | 2007535790 | 12/2007 |
| JP | 2008-170584 | 7/2008 |
| JP | 2008242217 | 10/2008 |
| TW | 493148 | 7/2002 |
| TW | 585275 | 4/2004 |
| TW | 200516295 | 5/2005 |
| TW | 200622403 | 7/2006 |
| TW | 200628909 | 8/2006 |
| TW | I271584 | 1/2007 |
| TW | M342603 | 10/2008 |
| TW | 200923507 | 6/2009 |
| TW | 201039022 | 11/2010 |
| TW | 201211644 | 3/2012 |
| TW | 201213881 | 4/2012 |
| TW | M429116 | 5/2012 |
| WO | 2008045207 | 4/2008 |

OTHER PUBLICATIONS

"Office Action of China Counterpart Application", dated Aug. 28, 2015, p. 1-p. 10, in which the listed references were cited.
"Office Action of Japan Counterpart Application", dated Apr. 30, 2014, p. 1-p. 6, in which the listed references were cited.
"Office Action of Taiwan Counterpart Application", dated Jul. 22, 2015, p. 1-p. 18, in which the listed references were cited.
"Office Action of China Counterpart Application", dated Mar. 18, 2016, p. 1-p. 6, in which the listed reference was cited.

* cited by examiner

HYBRID LIGHT GUIDE PLATE AND DISPLAY DEVICE

CROSS-REFERENCE TO RELATED APPLICATION

This application claims the priority benefits of Taiwan patent application serial no. 101127063, filed on Jul. 26, 2012, and Taiwan patent application serial no. 102114199, filed on Apr. 22, 2013, and Taiwan patent application serial no. 102125254, filed on Jul. 15, 2013. The entirety of each of the above-mentioned patent applications is hereby incorporated by reference herein and made a part of specification.

BACKGROUND OF THE INVENTION

Field of the Invention

The invention generally relates to a display device, and more particularly, to a display device wherein the back plate of the display module thereof serves as an appearance part by design as well and a hybrid light guide plate (hybrid LGP) and a display device with a hybrid LGP.

Description of Related Art

With the increasingly developments of the semiconductor industry and the relevant electronic industries, many digital tools such as mobile phone, digital camera, digital video camera, notebook computer, desktop computer, and flat-screen TV all are developing toward a more convenient, versatile, and aesthetically appearance direction. During using these products, the display screen is an indispensable interface, and through the display screen of the products, it is able to bring more convenience for the user's manipulation. Among them, the liquid crystal display (LCD) device has played a major rule of display screens. Since the LCD device itself does not have the luminous function, and therefore the LCD device must be equipped with a light source therebelow to provide the light beam required for displaying frames.

In terms of the notebook computer, a display module is assembled between an rear housing and a front frame of the display device. In recent years, some manufacturers have introduced a so-called thin notebook computer. Under the thin figure design condition, in general, one of the conventional schemes is to integrate a frame with the rear housing of the display module together to reduce the stacking number of the components and sub-assemblies. Under such a design approach, in order to avoid the warping of the rear housing of the display device to press the display module and avoid the back cover with an applied force from directly pressing the light guide plate (LGP) with weaker structural strength, a larger gap between the display module and the rear housing is required, which makes the whole thickness of the display device hard to be thinned. In addition, the rear housing serving as a major part to enhance the structural strength in the display device must not be too thin, and it also limits the display device to be thinner. Further, the material of the LGP is usually a resin material, which is easier to be expanded as heating or absorbing moisture. At the time, if the multiple sides of the LGP are fixed at the frame of the display module in adhering method, the structure deformation of the LGP, because the expansion direction is restricted, would be produced when the LGP gets expanded, which causes abnormal display frames. Therefore, the conventional LGP is suitable to be fixed in adhering along a single side of the LGP, but it accordingly makes the display module have poor structural strength.

China Patent No. CN101936509 discloses a backlight module structure and a fabrication method thereof, wherein the LGP adopts an optical glass plate to increase the structural strength of the backlight module. China Patent No. CN102354014 discloses a display module where supporting ribs are disposed on the sides other than the light incidence side. Taiwan Patent No. TWM429116 discloses an integrally moulded backlight module made of an electrochemical reinforced glass where the thinner figure is achieved through integrally moulding. Taiwan Patent No. TWM342603 discloses a hybrid light guide structure. Taiwan Patent Publication No. TW201213881 discloses an optical sheet. China Patent No. CN102374497 and Taiwan Patent No. TWI271584 disclose an LGP. PCT Patent Publication No. WO2008045207 discloses a display device. Taiwan Patent Publication No. TW200923507 discloses a planar light source device. China Patent No. CN102117109 discloses a portable computing equipment. China Patent No. CN102915134 and No. CN102981665 disclose a touch panel. China Patent No. CN102998818 discloses a display device. China Patent No. CN1936627 discloses an illumination device and a display device. Taiwan Patent Publication No. TW201039022 discloses an LGP structure. China Patent No. CN1497309 discloses a planar light source. Taiwan Patent Publication No. TW200622403 discloses a backlight module. Taiwan Patent No. TW585275 discloses a light source system. Taiwan Patent Publication No. TW200516295 discloses a backlight module.

SUMMARY OF THE INVENTION

Accordingly, the invention is directed to a display device meeting the requirement of thinner figure design.

The invention is directed to a hybrid LGP meeting the requirement of thinner figure design.

The invention is directed to a display device with a hybrid LGP meeting the requirement of thinner figure design.

The invention is directed to a display device meeting the requirement of thinner figure design and capable of saving assembling, procedures, and cost.

Other objectives and advantages of the invention should be further indicated by the disclosures of the invention.

To achieve at least one of the above-mentioned objectives, or to achieve other objectives, an embodiment of the invention provides a display device, which includes a housing, a frame, and a display module. The frame is bonded to the housing. The display module includes a back cover, an LGP, a support element, a display panel, and an optical film set. The back cover is bonded to the frame and is exposed by the housing. The LGP is supported on the back cover and has a light exiting surface and a back surface opposite to the light exiting surface, in which at least two sides of the back surface of the LGP are adhered on the back cover, and the material of the LGP is glass. The support element is supported on the LGP. The display panel is supported on the support element. The optical film set is disposed between the display panel and the LGP.

In the display device of an embodiment of the invention, the housing and the back cover enclose the LGP, the support element, the display panel, and the optical film set.

In the display device of an embodiment of the invention, the housing is a front frame and exposes a display surface of the display panel.

In the display device of an embodiment of the invention, the Young's modulus of the back cover is greater than 40 Gpa.

In the display device of an embodiment of the invention, the thickness of the back cover is less than 0.5 mm.

In the display device of an embodiment of the invention, a gap between the back cover and the LGP is less than 0.1 mm.

In the display device of an embodiment of the invention, the Young's modulus of the LGP is greater than 40 Gpa.

In the display device of an embodiment of the invention, the display panel has a display surface and an effective display region, a reference line extends from a boundary of the effective display region on the display surface to outside the effective display region, the reference line is perpendicular to the boundary, an included angle between the reference line and a normal direction of the effective display region is 45°, and an end of the LGP extends out of the effective display region and across the reference line.

In the display device of an embodiment of the invention, the support element has a recess, and the end of the LGP extends into the recess and supports the support element.

In the display device of an embodiment of the invention, the support element has a slot, and the end of the LGP goes through the slot and supports the support element.

The display device of an embodiment of the invention further includes a plurality of conductive wires, in which the conductive wires are disposed on the frame.

In the display device of an embodiment of the invention, the thickness of the display device is less than 4 mm.

The display device of an embodiment of the invention further includes a light source, in which the light source is disposed on the back cover and adjacent to a light incidence side of the LGP.

In the display device of an embodiment of the invention, the light source has a light-emitting surface, the LGP has two chamfers, one of the chamfers is connected to the light incidence side and the light exiting surface, the other chamfer is connected to the light incidence side and the back surface, and the height of the light-emitting surface of the light source is the same as the height of the light incidence side of the LGP.

The display device of an embodiment of the invention further includes an optical adhesive, in which the light-emitting surface of the light source, the light incidence side of the LGP, and the chamfers are connected to each other through the optical adhesive.

In the display device of an embodiment of the invention, a reflective sheet is disposed under a back surface of the LGP.

In the display device of an embodiment of the invention, the support element is an elastic buffer material.

An embodiment of the invention provides a hybrid LGP, which includes at least one first light guide sub-plate and at least one second light guide sub-plate, in which the second light guide sub-plate is stacked on the first light guide sub-plate and bonded to the first light guide sub-plate, and ratio of the thickness of the first light guide sub-plate over the thickness of the second light guide sub-plate falls within a range greater than or equal to 0.2 and less than or equal to 5.

An embodiment of the invention provides a display device, which includes a housing, a frame, and a display module. The frame is bonded to the housing. The display module includes a back cover, a hybrid LGP, a support element, a display panel, and an optical film set. The back cover is bonded to the frame. The hybrid LGP is supported on the back cover and has a light exiting surface and a back surface opposite to the light exiting surface. At least two sides of the back surface of the hybrid LGP are adhered on the back cover. The support element is supported on the hybrid LGP. The display panel is supported on the support element, and the optical film set is disposed between the display panel and the hybrid LGP.

In an embodiment of the invention, an absolute value of a difference between refractive indices of the materials of the first light guide sub-plate and the second light guide sub-plate is less than 0.05.

In an embodiment of the invention, the hybrid LGP further includes a plurality of scattering microstructures disposed on at least one of the first light guide sub-plate and the second light guide sub-plate. The scattering microstructure is fabricated by using an ink printing process, an ink-jetting process or a photolithography process, and prior to the ink-jetting process, a plasma process is performed to fabricate a hydrophobic layer on a surface of at least one of the first light guide sub-plate and the second light guide sub-plate.

In an embodiment of the invention, the display device further includes a reflective sheet disposed between the back surface and the back cover, in which the reflective sheet is supported on the back cover and the hybrid LGP is supported on the reflective sheet.

In an embodiment of the invention, the hybrid LGP includes at least one first light guide sub-plate and at least one second light guide sub-plate, and the ratio of the thickness of the first light guide sub-plate over the thickness of the second light guide sub-plate falls within a range greater than or equal to 0.2 and less than or equal to 5.

In an embodiment of the invention, the material of the first light guide sub-plate is glass, and the material of the second light guide sub-plate is plastic.

In an embodiment of the invention, the mechanical strength of the first light guide sub-plate is greater than the mechanical strength of the second light guide sub-plate, and the optical absorption rate of the first light guide sub-plate is greater than the optical absorption rate of the second light guide sub-plate.

In an embodiment of the invention, the uniformity of the optical absorption rates of the first light guide sub-plate relatively to the different wavelengths in the visible light is less than the uniformity of the optical absorption rates of the second light guide sub-plate relatively to the different wavelengths in the visible light.

In an embodiment of the invention, the hybrid LGP further includes at least one transparent connection layer, and the first light guide sub-plate and the second light guide sub-plate are connected to each other through the transparent connection layer.

In an embodiment of the invention, the first light guide sub-plate and the second light guide sub-plate contact each other.

In an embodiment of the invention, the hybrid LGP further includes at least one third light guide sub-plate, in which the third light guide sub-plate is bonded onto the first light guide sub-plate, onto the second light guide sub-plate or between the first light guide sub-plate and the second light guide sub-plate.

In an embodiment of the invention, the thickness of the hybrid LGP is greater than or equal to the thickness of the back cover.

In an embodiment of the invention, the thickness of the hybrid LGP falls within a range greater than or equal to 0.2 mm and less than or equal to 3 mm and the thickness of the back cover falls within a range greater than or equal to 0.1 mm and less than or equal to 3 mm.

An embodiment of the invention provides a display device, which includes a transparent plate and a display module. The display module includes a back cover, an LGP, a support element, a display panel, and an optical film set. The back cover is bonded to the transparent plate. The LGP is supported on the back cover and has a light exiting surface and a back surface opposite to the light exiting surface, in which at least two sides of the back surface of the LGP are adhered on the back cover. The support element is supported on the back cover and disposed between the transparent plate and the back cover. The display panel is connected to the transparent plate through an optical adhesive, and the optical film set is disposed between the display panel and the LGP.

In an embodiment of the invention, the transparent plate and the back cover enclose the LGP, the support element, the display panel, and the optical film set.

In an embodiment of the invention, the LGP is a glass LGP or a hybrid LGP.

In an embodiment of the invention, the hybrid LGP has at least one first light guide sub-plate and at least one second light guide sub-plate, the second light guide sub-plate is stacked on the first light guide sub-plate and bonded to the first light guide sub-plate, in which the material of the first light guide sub-plate is glass and the material of the second light guide sub-plate is plastic.

In an embodiment of the invention, the hybrid LGP has at least one first light guide sub-plate and at least one second light guide sub-plate, the second light guide sub-plate is stacked on the first light guide sub-plate and bonded to the first light guide sub-plate, in which the material of the first light guide sub-plate is polymethylmethacrylate (PMMA) and the material of the second light guide sub-plate is polycarbonate (PC).

Based on the description above, in the embodiments of the invention, the back cover of the display module and the housing of the display device are combined to become an appearance piece or the back cover of the display module and the transparent plate of the display device are combined to become an appearance piece, so that the display device could reduce the thickness thereof without disposing a rear housing behind the back surface of the display module and it could be avoided that the display module is pressed due to the warping of the rear housing. The layout of combining the back cover of the display module and the transparent plate of the display device to become an appearance piece can also save the assembling, the procedures, and the cost. In addition, the glass LGP or the hybrid LGP can serve as a major part in the display device to increase the structural strength. At the time, when the back cover of the display module is applied by an external force to press the glass LGP or the hybrid LGP, the glass LGP or the hybrid LGP with better structural strength can withstand the force coming from the back cover without getting deformed or damaged. Therefore, it is no need to reserve a larger gap between the back cover and the glass LGP (hybrid LGP) to avoid the glass LGP or the hybrid LGP from being pressed by the back cover, which further reduces the thickness of the display device. In addition, the glass LGP and the hybrid LGP are unlikely to be expanded as heating or adsorbing moisture, thus, a plurality of sides of the back surfaces of the glass LGP or the hybrid LGP can be adhered to the back cover to make the glass LGP (the hybrid LGP) and the back cover more closely bonded together to enhance the overall structural strength of the display device. Moreover, since the hybrid LGP of the embodiments of the invention includes at least two light guide sub-plates of different materials, the hybrid LGP has both good mechanical strength and good optical characteristic to make the hybrid LGP of the embodiments of the invention have more wide adaptations to satisfy more application needs.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
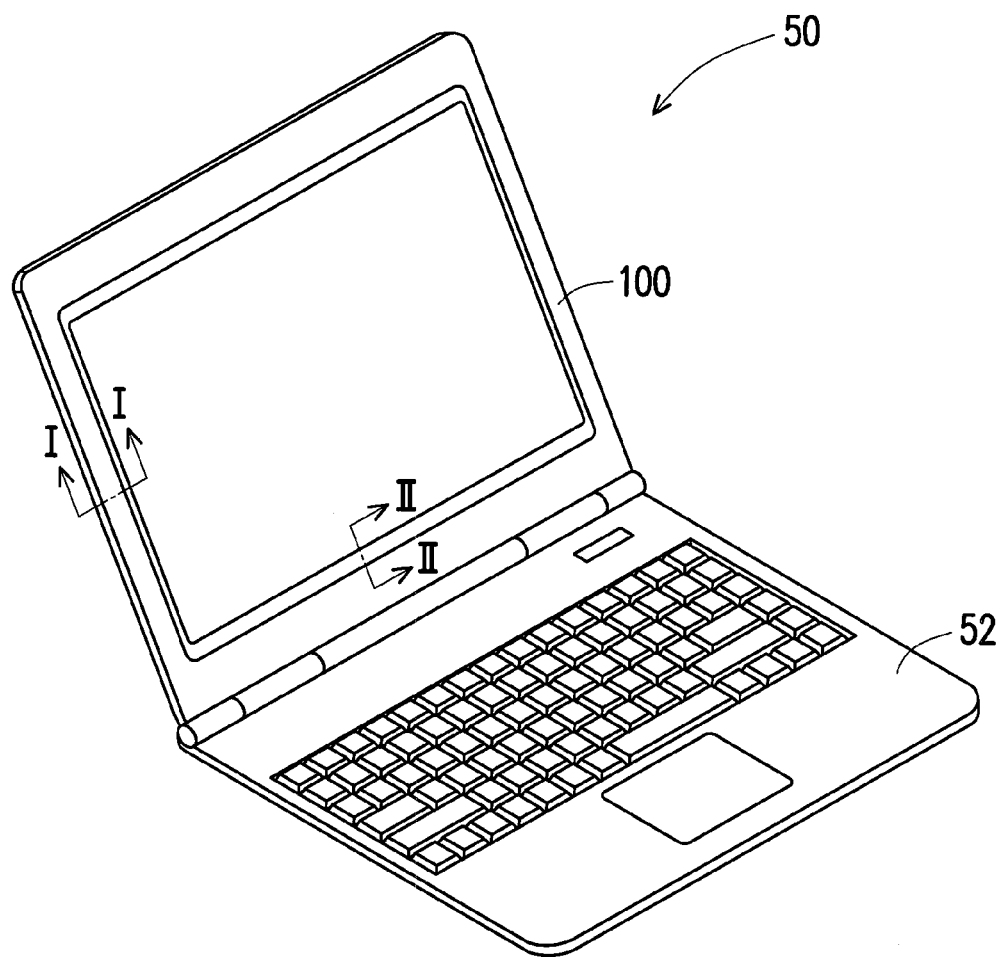
FIG. 1 is a three-dimensional diagram of a notebook computer according to an embodiment of the invention.

FIG. 1 is a three-dimensional diagram of a notebook computer according to an embodiment of the invention. Referring to FIG. 1, an electronic device 50 of the embodiment is, for example, a notebook computer. In the embodiment, the electronic device 50 includes a host 52 and a display device 100. The display device 100 is pivoted to the host 52 to make the display device 100 suitable to be unfolded or folded relatively to the host 52.

Figure 2:
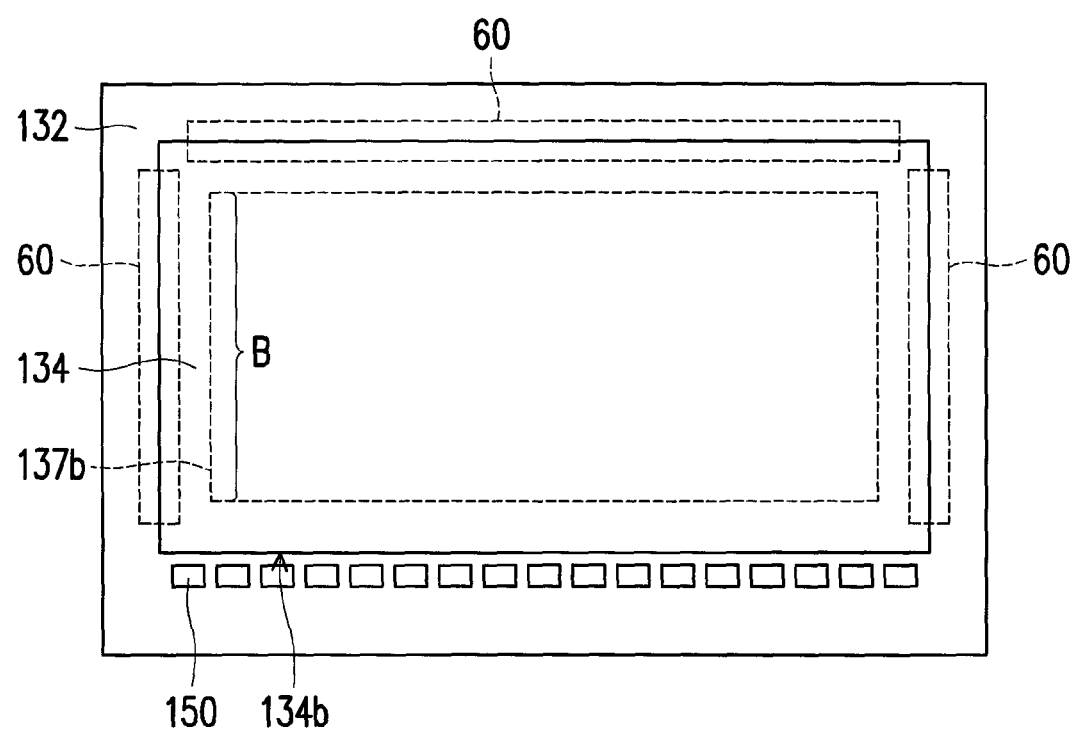
FIG. 2 is a schematic diagram of partial parts of the display device in FIG. 1.
Figure 3A:
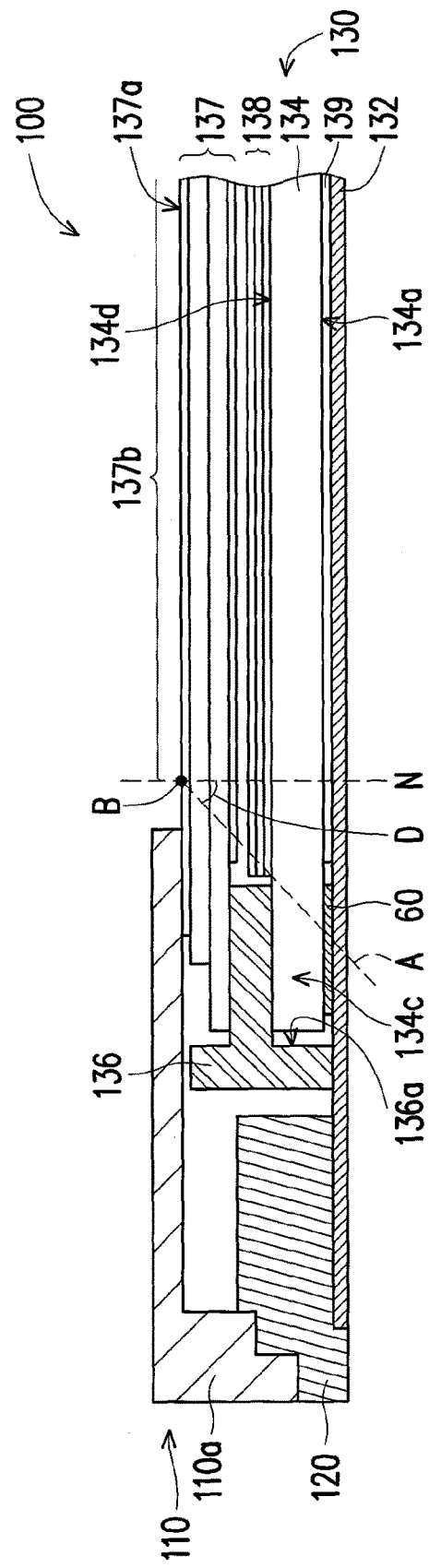
FIG. 3A is a cross-sectional diagram of the display device in FIG. 1 along line I-I.
Figure 3B:
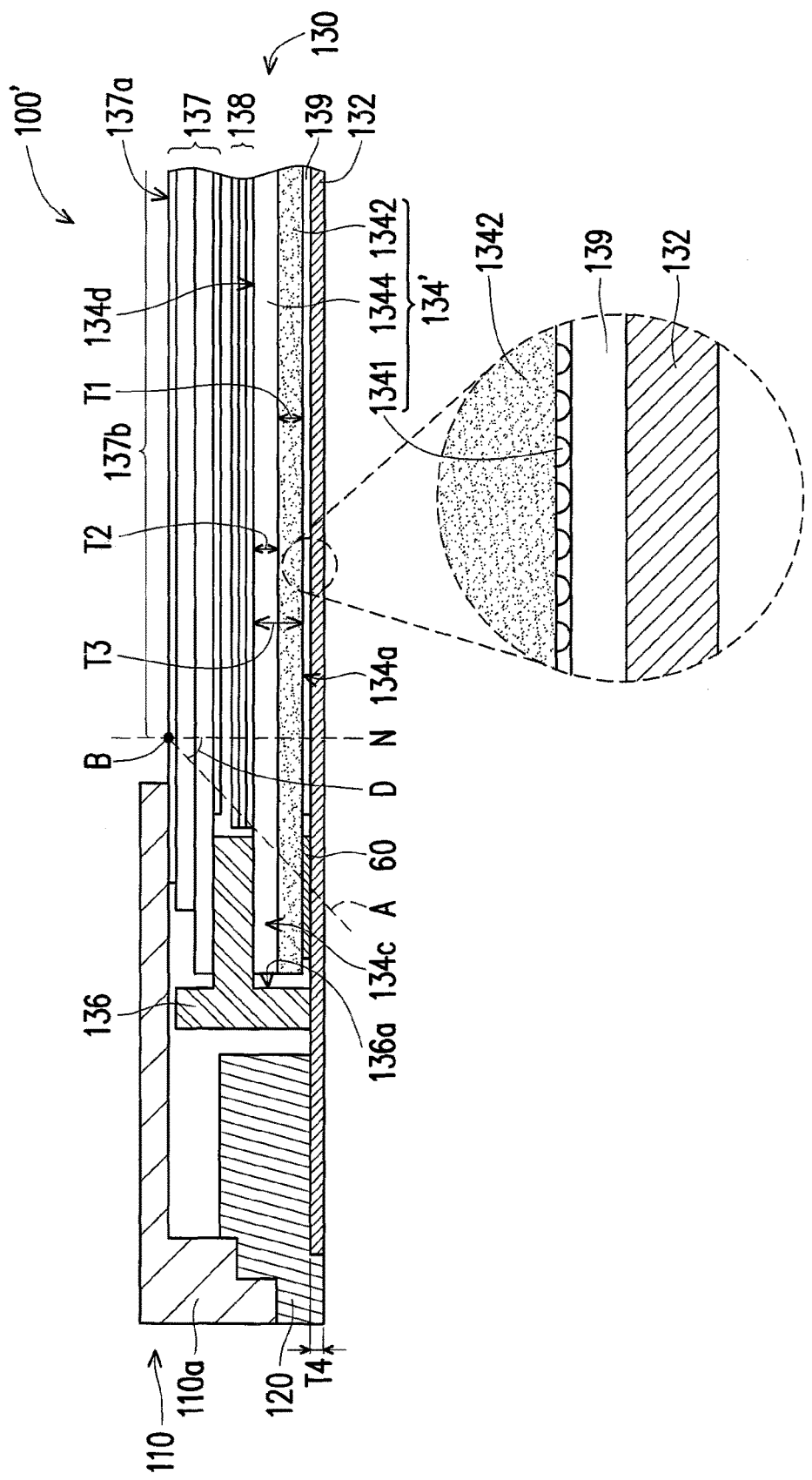
FIG. 3B is a cross-sectional diagram of the display device in FIG. 3A wherein the LGP is replaced by a hybrid LGP.

FIG. 2 is a schematic diagram of partial parts of the display device in FIG. 1, FIG. 3A is a cross-sectional diagram of the display device in FIG. 1 along line I-I, and FIG. 3B is a cross-sectional diagram of the display device in FIG. 3A wherein the LGP is replaced by a hybrid LGP. For better understanding, in FIG. 2, only partial parts of FIG. 3A, i.e., an LGP 134 and a back cover 132 are illustrated. Referring to FIGS. 2, 3A, and 3B, the display device 100 in the embodiment of FIG. 3A includes a housing 110, a frame 120, and a display module 130. The frame 120 is bonded to the housing 110. The display module 130 includes a back cover 132, an LGP 134, a support element 136, a display panel 137, and an optical film set 138. The back cover 132 is bonded to the frame 120, where the bonding way can be adhering, ultrasonic welding or integrally moulding. The LGP 134 is supported on the back cover 132. The support element 136 is supported on the LGP 134, the display panel 137 is supported on the support element 136, and the optical film set 138 is disposed between the display panel 137 and the LGP 134. The LGP has a light exiting surface 134d and a back surface 134a opposite to the light exiting surface 134d (referring to FIG. 3A). A plurality of sides of the back surface 134a of the LGP 134 (i.e., other sides except for the light incidence side 134b) are adhered on the back cover 132 by using a plurality of pieces of double-sided adhesive 60. In the embodiment of FIG. 2, three sides of the back surface 134a are adhered to the back cover 132; in other embodiments, only two sides opposite to the light incidence side 134b of the back surface 134a of the LGP 134 are adhered to the back cover 132.

The parts and the layout thereof in the display device 100' of FIG. 3B is similar to the parts and the layout thereof in the display device 100 of FIG. 3A except that the LGP 134 in the display device 100 of FIG. 3A is replaced by a hybrid LGP 134' to become the display device 100' of FIG. 3B. The hybrid LGP 134' includes at least one first light guide sub-plate 1342 (only one first light guide sub-plate 1342 as an example in FIG. 3B) and at least one second light guide sub-plate 1344 (only one second light guide sub-plate 1344 as an example in FIG. 3B). The second light guide sub-plate 1344 is stacked on and bonded to the first light guide sub-plate 1342. In the embodiment, mechanical strength of the first light guide sub-plate 1342 is greater than mechanical strength of the second light guide sub-plate 1344, and optical absorption rate of the first light guide sub-plate 1342 is greater than optical absorption rate of the second light guide sub-plate 1344. In addition, in this embodiment, the uniformity of the optical absorption rates of the first light guide sub-plate 1342 relatively to the different wavelengths in the visible light is less than the uniformity of the optical absorption rates of the second light guide sub-plate 1344 relatively to the different wavelengths in the visible light in the embodiment. For example, the material of the first light guide sub-plate 1342 is glass, for example, reinforced glass, optical glass, a artificial crystal slice of quartz, a artificial crystal slice of sapphire, or a artificial crystal slice of any other mineral. The glass may also be quartz glass, lead glass, borosilicate glass. The reinforced glass may be chemically strengthened glass or physically strengthened glass, e.g. tempered glass or heat-strengthen glass. The glass may be low iron glass, laminated glass, or Gorilla Glass product of Corning Inc. The compositions and types of the glass are numerous, and the invention is not limited thereto. Specifically, the first light guide sub-plate 1342 in this embodiment is, for example, Corning Gorilla 2318 glass, Corning Gorilla 2319 or Soda lime glass; the material of the second light guide sub-plate 1344 is plastic, for example, polymethylmethacrylate (PMMA).

Under the above-mentioned layout, the back cover 132 of the display module 130 combines the housing 110 of the display device 100 or 100' to serve as an appearance part so that the overall thickness of the display devices 100 or 100' is reduced without disposing a rear housing behind the back surface of the display module 130 in the display devices 100 or 100'. In comparison with the prior art where the LGP is made of plastic, the LGP 134 of the display device 100 is made of glass and the hybrid LGP 134' of the display device 100' adopts the first light guide sub-plate 1342 with stronger mechanical strength (the material thereof is, for example, glass) herein, so that the LGP 134 and the hybrid LGP 134' provide the display devices 100 and 100' with a primary strong mechanical strength. In particular, when the back cover 132 of the display module 130 is applied by an external force to press the LGP 134 or the hybrid LGP 134', the LGP 134 or the hybrid LGP 134' with better mechanical strength is able to withstand the force coming from the back cover 132 without deformation or damage. Therefore, no need to reserve a larger gap between the back cover 132 and the LGP 134 (the hybrid LGP 134') to avoid the LGP 134 or the hybrid LGP 134' from being pressed by the back cover 132, which can further reduce the thickness of the display device 100.

Since the hybrid LGP 134' has better mechanical strength to serve as the primary mechanical strength part in the display device 100', in the embodiment, a thickness T3 of the hybrid LGP 134' can be greater than or equal to a thickness T4 of the back cover 132, i.e., the back cover 132 can be thinner so as to further reduce the overall thickness of the display device 100'. In an embodiment, the thickness T3 of the hybrid LGP 134' falls within a range greater than or equal to 0.2 mm and less than or equal to 3 mm, and the thickness T4 of the back cover 132 falls within a range greater than or equal to 0.1 mm and less than or equal to 3 mm.

Figure 4A:
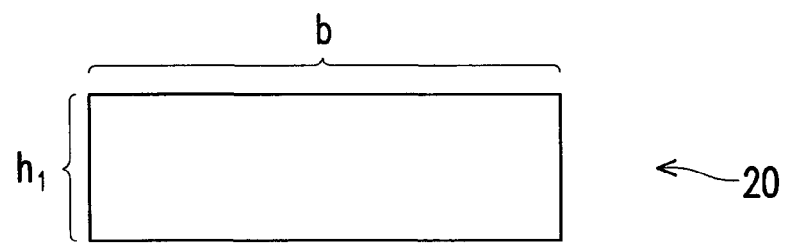
FIGS. 4A and 4B are respectively a schematic diagram of an exemplary structure-body.
Figure 4B:
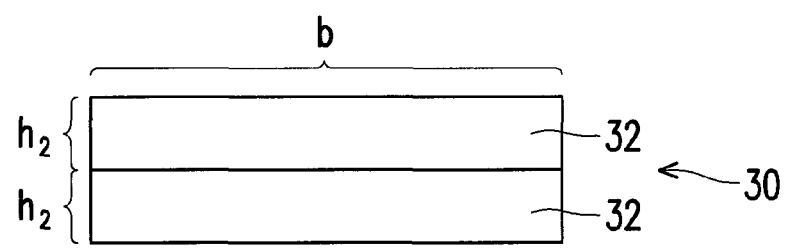

In addition, since the glass adopted by the LGP 134 and the first light guide sub-plate 1342 is unlikely expanded as heating or adsorbing moisture, so that the sides of the back surface 134a of the LGP 134 or the hybrid LGP 134' are adhered to the back cover 132 to make the LGP 134, the hybrid LGP 134', and the back cover 132 more closely bonded together to enhance the overall structural strength of the display device 100, referring the following FIGS. 4A and 4B for details.

FIGS. 4A and 4B are respectively a schematic diagram of an exemplary structure-body. Referring to FIGS. 4A and 4B, the width and the thickness of a first structure-body 20 are respectively b and $h_1$. A second structure-body 30 includes two cuboids 32, in which the width and the thickness of each of the cuboids 32 are respectively b and $h_2$. Thus, the thickness $h_1$ of the first structure-body 20 is equal to $2h_2$.

The formula to calculate the moment of inertia I of the structure-body is:

$$I = \frac{bh^3}{12}$$

The moment of inertia $I_1$ and the moment of inertia $I_2$ respectively corresponding to FIGS. 4A and 4B are obtained by the calculations of the above-mentioned formula:

$$I_1 = \frac{bh_1^3}{12} = \frac{8bh_2^3}{12}; I_2 = \frac{bh_2^3}{12} + \frac{bh_2^3}{12} = \frac{2bh_2^3}{12}$$

Therefore, the moment of inertia $I_1$ corresponding to FIG. 4A is much greater than the moment of inertia $I_2$ corresponding to FIG. 4B. In the embodiment, the two cuboids 32 of the second structure-body 30 are respectively corresponding to the back cover 132 and the LGP 134 in FIG. 3A. In comparison with the prior art where the LGP of the display device has only one side is adhered to the back cover, the multiple sides of the LGP 134 in the embodiment are all adhered to the back cover 132, so that the bonding state of the LGP 134 and the back cover 132 is more close to the state shown by FIG. 4A to make the display device have better structural strength.

Referring to FIGS. 3A and 3B, in the embodiment, both the housing 110 and the back cover 132 are the appearance pieces of the display device 100 and enclose the LGP 134 (hybrid LGP 134'), the support element 136, the display panel 137, and the optical film set 138. When the LGP 134 and the first light guide sub-plate 1342 are made of glass, the LGP 134 and the first light guide sub-plate 1342 could have a pattern layer, which is formed on the surface (for example, the back surface 134a of the LGP 134) of the glass in ink printing, ink jetting or photolithography process. A plurality of scattering microstructures 1341 of the hybrid LGP 134' could be formed on the surface of the first light guide sub-plate 1342 (for example, the back surface 134a of the hybrid LGP 134') in ink printing, ink jetting or photolithography process to achieve the effect of guiding light and uniforming light-emitting. At the time, prior to the ink printing, a plasma process could be performed to fabricate a hydrophobic layer on the surface of the first light guide sub-plate 1342 so as to enhance the adhesion of the scattering microstructures 1341 (ink) on the first light guide sub-plate 1342 made of glass. In addition, a reflective sheet 139 is disposed under the back surface 134a of the LGP 134 (hybrid LGP 134'). By adjusting the thickness of the double-sided adhesive 60, the reflective sheet 139 could contact or not contact the back cover 132 so that there is no gap or an extremely small gap between the LGP 134 (hybrid LGP 134') and the back cover 132. In more details, the reflective sheet 139 is disposed between the back surface 134a and the back cover 132, and in an embodiment, the reflective sheet 139 is supported on the back cover 132, while the LGP 134 (the hybrid LGP 134') is supported on the reflective sheet 139.

The housing 110 of the embodiment is a front frame 110a exposing a display surface 137a of the display panel 137. In comparison with the housing of the conventional display device wherein there is a rear housing behind the back cover to serve as an appearance piece, the back cover 132 of the display module 130 in the embodiment replaces the function of the rear housing in the prior art (i.e. omits the rear housing) to become the appearance piece so as to reduce the whole thickness of the display devices 100 and 100'. Taking an example, the thickness of the display devices 100 and 100' is less than 4 mm, and the gap between the back cover 132 and the LGP 134 (the hybrid LGP 134') is less than 0.1 mm by design.

In the embodiment, the materials of the LGP 134 and the first light guide sub-plate 1342 could be an appropriate glass of an appropriate type with a Young's modulus greater than 40 Gpa to meet the requirement of structural strength for real products. The material of the back cover 132 in the embodiment could be steel plate, aluminium alloy or other high-strength metal with a Young's modulus greater than 40 Gpa. At the time, the thickness of the back cover 132 is less than 0.5 mm by design but the sufficient structural strength is still ensured. In addition, the back cover 132 of the embodiment could be made of carbon fiber as well. When the back cover 132 is made of carbon fiber, the edge of the back cover 132 could be closer to the LGP 134 and the center portion of the back cover 132 could be farther away from the LGP 134 (the hybrid LGP 134') by design according to the requirement of the product figure, where the center portion of the back cover 132 could avoid a force applied thereto to get sunken deformation by means of the low ductility characteristics of carbon fiber.

Figure 5A:
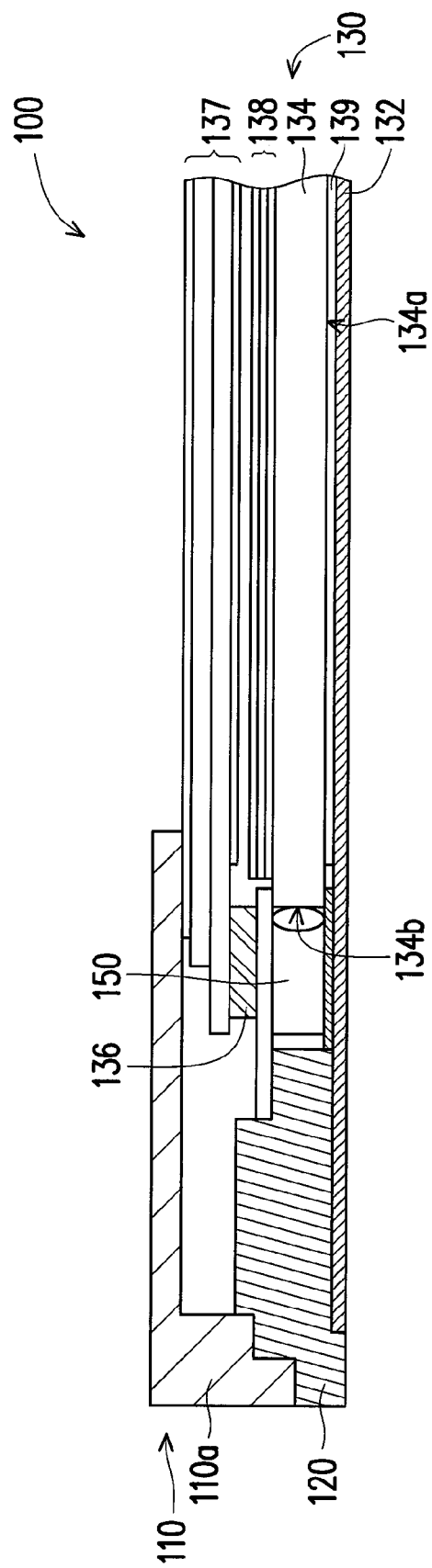
FIG. 5A is a cross-sectional diagram of a display device in FIG. 1 along line II-II.
Figure 5B:
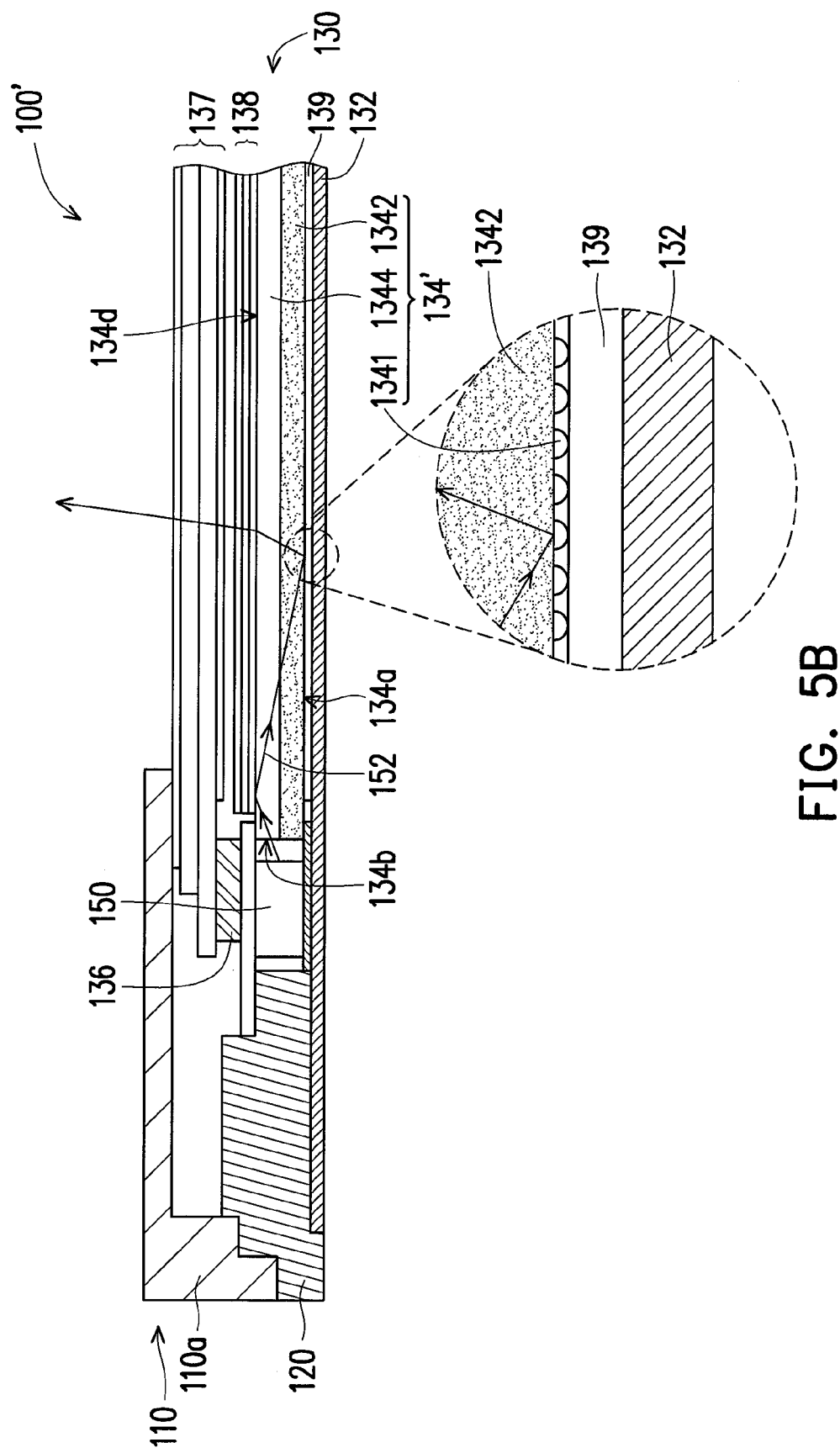
FIG. 5B is a cross-sectional diagram of the display device in FIG. 5A wherein the LGP is replaced by a hybrid LGP.

FIG. 5A is a cross-sectional diagram of a display device in FIG. 1 along line II-II and FIG. 5B is a cross-sectional diagram of the display device in FIG. 5A wherein the LGP is replaced by a hybrid LGP. Referring to FIGS. 2, 5A, and 5B, in the embodiment, the display devices 100 and 100' further respectively include a light source 150, in which the light source 150 is disposed on the back cover 132 and adjacent to the light incidence side 134b of the LGP 134 (the hybrid LGP 134'). The light source 150 is, for example, a light emitting diode (LED) light source. The light source 150 of the display module 130 is capable of emitting light beam, and the light beam enters the LGP 134 (the hybrid LGP 134')

through the light incidence side 134b of the LGP 134 (the hybrid LGP 134'), and is then emitted out towards the optical film set 138 and the display panel 137, so as to provide the light beam required for the display panel 137 displaying frames. In more details, referring to FIG. 5B, the light beam 152 entering the hybrid LGP 134' through the light incidence side 134b would make total reflections in at least one time between the light exiting surface 134d and the back surface 134a, while the scattering microstructures 1341 disposed on the first light guide sub-plate 1342 (for example, the scattering microstructures 1341 disposed on the back surface 134a) would destroy the total reflection to make the light beam 152 scatter onto the light exiting surface 134d followed by exiting from the light exiting surface 134d, or scatter onto a reflective sheet 139 at a side of the back surface 134a. After the light beam 152 is reflected by the reflective sheet 139, the light beam 152 sequentially passes through the first light guide sub-plate 1342 and the second light guide sub-plate 1344 to exit from the light exiting surface 134d. In another embodiment, the scattering microstructures 1341 could be disposed on the light exiting surface 134d of the hybrid LGP 134' (for example, the surface of the second light guide sub-plate 1344). In addition, in yet another embodiment, the scattering microstructures 1341 could be disposed on both the first light guide sub-plate 1342 and the second light guide sub-plate 1344, in other words, the scattering microstructures 1341 could be disposed on both the back surface 134a and the light exiting surface 134d.

When the LGP is made of the glass, the optical absorption rate of the glass is greater than the optical absorption rate of the plastic, so that the light intensity of the light beam exiting from the LGP of the glass is less than the light intensity of the light beam exiting from the LGP of the plastic. Accordingly, in the embodiment, the hybrid LGP 134' employs the second light guide sub-plate 1344 (for example, light guide sub-plate of the plastic) with smaller optical absorption rate, so that in the embodiment, the light intensity of the light beam 152 exiting from the hybrid LGP 134' is greater than the light intensity of the light beam exiting from the LGP of the glass.

It should be noted that the uniformity of the optical absorption rates of the glass relatively to the different wavelengths in the visible light is less than the uniformity of the optical absorption rates of the plastic relatively to the different wavelengths in the visible light, i.e., the optical absorption rates of the glass relatively to the different wavelengths in the visible light are not the same and have larger difference from each other. For the LGP made of the glass, when the distance for the light beam to travel in the glass is longer, the differences of the optical absorption rates corresponding to different wavelengths are more significant and the color uniformity of the light beam is thereby reduced more noticeable. Specifically, the color uniformity of the light beam exiting from the other side opposite to the light incidence side of the LGP has more reduction. Therefore, the hybrid LGP 134' in the embodiment adopts the second light guide sub-plate 1342 (for example, the light guide sub-plate of the plastic) having a larger uniformity of the optical absorption rates relatively to the different wavelengths in the visible light so that the color uniformity of the light beam 152 exiting from the hybrid LGP 134' in the embodiment is greater than the color uniformity of the light beam 152 exiting from the LGP of the glass.

In the embodiment, the ratio of the thickness T1 of the first light guide sub-plate 1342 over the thickness T2 of the second light guide sub-plate 1344 falls within a range greater than or equal to 0.2 and less than or equal to 5 so as to make the mechanical strength, the exiting light intensity, and the color uniformity of the exiting light of the hybrid LGP 134' fall within compromised and appropriate ranges and make the hybrid LGP 134' of the embodiment meet the most application needs of the users.

In the embodiment, the first light guide sub-plate 1342 and the second light guide sub-plate 1344 directly contact each other, and the absolute value of the difference between refractive indices of the materials of the first light guide sub-plate 1342 and the second light guide sub-plate 1344 is less than 0.05. In this way, when the light beam 152 travels between the first light guide sub-plate 1342 and the second light guide sub-plate 1344 back and forth, the interface between the first light guide sub-plate 1342 and the second light guide sub-plate 1344 unlikely reflects the light beam 152 or makes the light beam 152 totally reflected. Thus, the light beam 152 could be smoothly scattered by the scattering microstructures 1341, not be restricted in a single light guide sub-plate.

Referring to FIGS. 2, 3A, and 3B, in the embodiment, the display panel 137 has an effective display region 137b. In more details, the front frame 110a covers the portion of the display panel 137 other than the effective display region 137b. A reference line A extends from a boundary B of the effective display region 137b on the display surface 137a to outside the effective display region 137b. The reference line A is perpendicular to the boundary B, and an included angle D between the reference line A and a normal direction N of the effective display region 137b is 45°. In the prior art, the LGP adopts a material with a lower structural strength (for example, acrylic resin), therefore, the end of the LGP in the prior art usually extends from the effective display region until the reference line A only. On the contrary, since the LGP 134 and the first light guide sub-plate 1342 in the embodiment adopt a glass with higher strength, the end 134c of the LGP 134 and the hybrid LGP 134' extends out of the effective display region 137b and across the reference line A so as to provide the whole structure of the display devices 100 and 100' with support.

Figure 6:
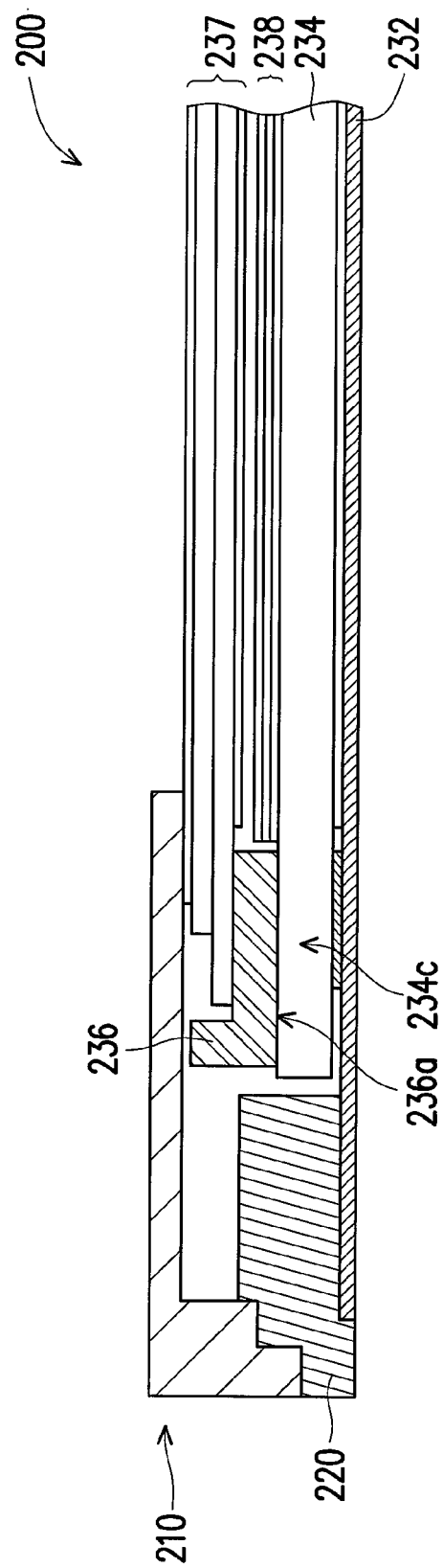
FIG. 6 is a cross-sectional diagram of a display device according to another embodiment of the invention.

Specifically, in the embodiment of FIGS. 3A and 3B, the support element 136 has a recess 136a, and the end 134c of the LGP 134 or the hybrid LGP 134' extends across the reference line A to enter the recess 136a and supports the support element 136. The invention does not limit the shape of the support element referring to the depiction of the following figure. FIG. 6 is a cross-sectional diagram of a display device according to another embodiment of the invention. Referring to FIG. 6, in a display device 200 of the embodiment, the layout of a housing 210, a frame 220, a back cover 232, a display panel 237, and an optical film set 238 is similar to the layout of the housing 110, the frame 120, the back cover 132, the display panel 137, and the optical film set 138 in FIG. 3A, which is omitted to describe. The difference of the display device 200 of the embodiment from the display device 100 in FIG. 3A rests in that the support element 236 has a slot 236a, and the end 234c of the LGP 234 goes through the slot 236a and supports the support element 236.

Figure 7:
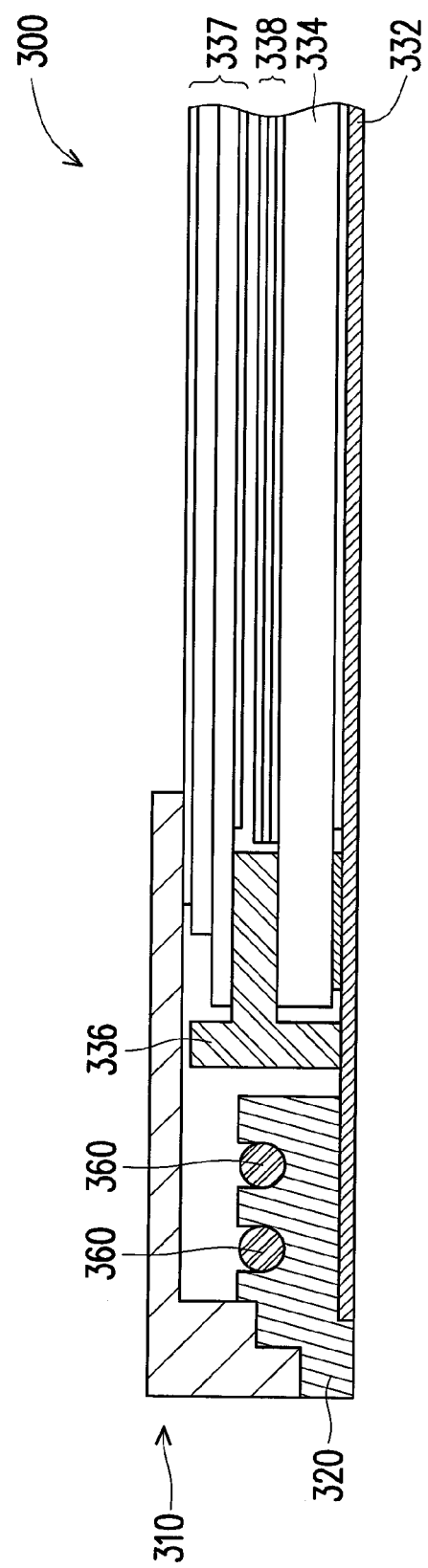
FIG. 7 is a cross-sectional diagram of a display device according to yet another embodiment of the invention.

In the above-mentioned embodiments, the material of the frame 120 and the frame 220 could be aluminium, aluminium-magnesium alloy or carbon fiber so as to increase the whole structural strength of the display device 100. FIG. 7 is a cross-sectional diagram of a display device according to yet another embodiment of the invention. Referring to FIG. 7, in a display device 300 of the embodiment, the layout of a housing 310, a back cover 332, an LGP 334, a support element 336, a display panel 337, and an optical film set 338 is similar to the layout of the housing 110, the back cover 132, the LGP 134, the support element 136, the display panel 137, and the optical film set 138 in FIG. 3A, which is omitted to describe. The difference of the display device 300 of the embodiment from the display device 100 in FIG. 3A rests in that the display device 300 further includes a plurality of conductive wires 360, and the conductive wires 360 are disposed on a frame 320. The frame 320 herein functions not only to combine the back cover 332 with the housing 310, but also to place the conductive wires 360.

Figure 8:
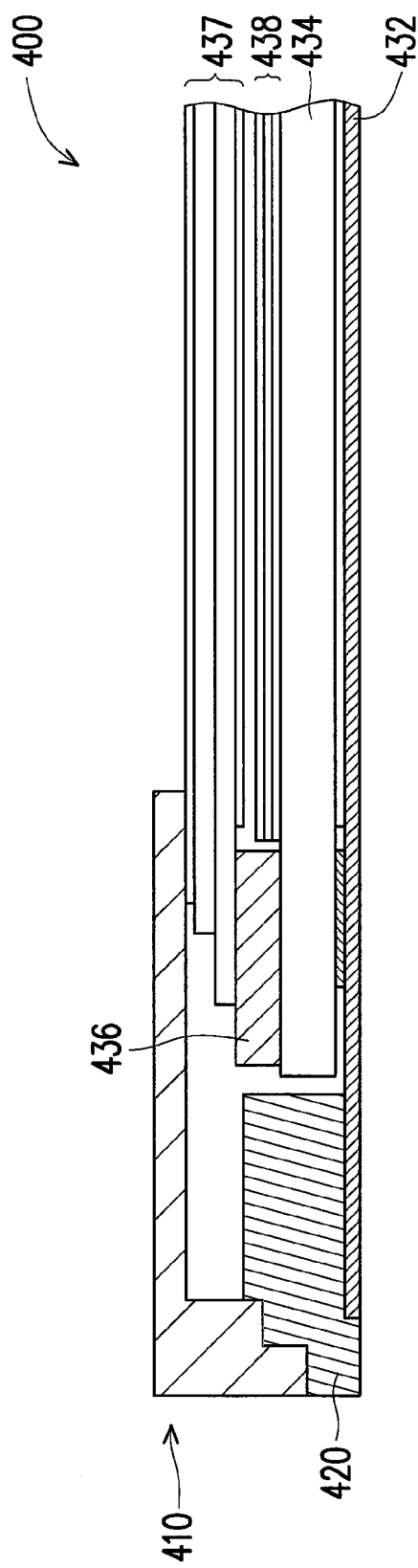
FIG. 8 is a cross-sectional diagram of a display device according to yet another embodiment of the invention.

FIG. 8 is a cross-sectional diagram of a display device according to yet another embodiment of the invention. Referring to FIG. 8, in a display device 400 of the embodiment, the layout of a housing 410, a frame 420, a back cover 432, an LGP 434, a display panel 437, and an optical film set 438 is similar to the layout of the housing 110, the frame 120, the back cover 132, the LGP 134, the display panel 137, and the optical film set 138 in FIG. 3A, which is omitted to describe. The difference of the display device 400 of the embodiment from the display device 100 in FIG. 3A rests in that the support element 436 could be an elastic buffer material, for example, rubber or double-sided adhesive with elasticity. In addition, in the embodiments of FIGS. 6-8, the LGPs 234, 334, and 434 could be the same as the hybrid LGP 134' in FIG. 3B, which the invention is not limited to.

Figure 9:
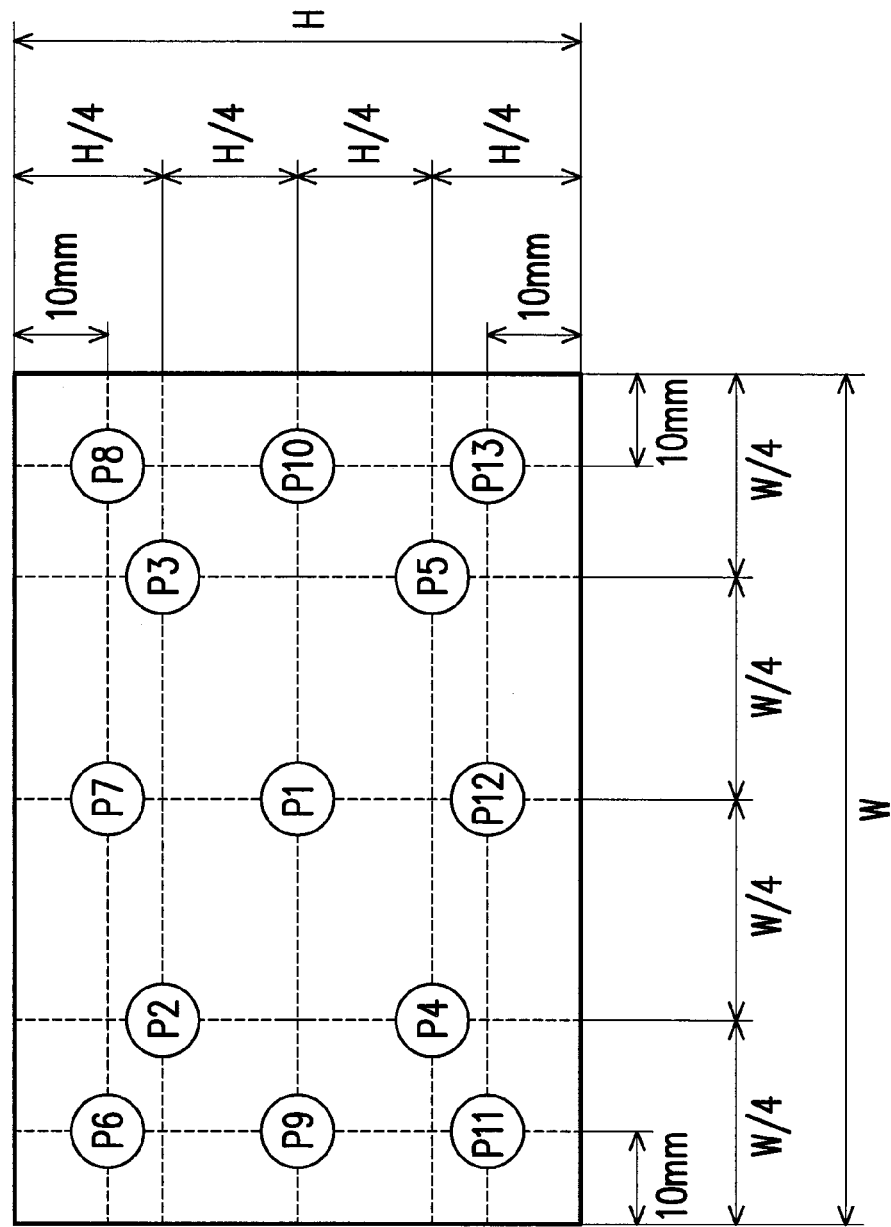
FIG. 9 is a schematic diagram showing the optical measuring positions of the display device of FIG. 3B.

FIG. 9 is a schematic diagram showing the optical measuring positions of the display device of FIG. 3B. Referring to FIGS. 2, 3B, and 9, the rectangular range in FIG. 9 represents the effective display region 137b of the display device 100', and optical measuring positions P1-P13 in the effective display region 137b are shown by FIG. 9. For example, the optical measuring position P6 is at a position at the upper left corner of the effective display region 137b with a distance of 10 mm respectively from the two adjacent sides of the effective display region 137b, while the optical measuring position P2 is at a position with a horizontal distance of ¼ width (i.e., the width of the effective display region 137b) from the upper left corner of the effective display region 137b towards right and a vertical distance of ¼ height (i.e., the height of the effective display region 137b) from the upper left corner of the effective display region 137b towards down, and the analog for the rest optical measuring positions shown by FIG. 9. The optical measuring data of the display device 100' in the embodiment are listed in Table 1:

TABLE 1

| Material | PMMA | Glass | Hybrid LGP |
|---|---|---|---|
| brightness average-value of P1-P5 | 4026.8 | 3179.4 | 3445.8 |
| ratio of the minimum divided by the maximum among the measured brightness of P1-P5 | 78.65% | 85.84% | 79.32% |
| ratio of the minimum divided by the maximum among the measured brightness of P1-P13 | 61.41% | 70.74% | 71.13% |
| color coordinate Cx measured at P1 | 0.2855 | 0.2967 | 0.2918 |
| color coordinate Cy measured at P1 | 0.2803 | 0.3055 | 0.2875 |
| chromatic aberration delta u'v'(T) | 0.0062 | 0.0115 | 0.0111 |
| chromatic aberration delta u'v'(N) | 0.0069 | 0.0063 | 0.0133 |
| average brightness measured at 15*9 points | 3843.41 | 3116.94 | 3362.41 |
| difference between the average brightness measured at 15*9 points of different LGPs (0.0% is defined based on PMMA material) | 0.0% | −18.9% | −12.5% |

TABLE 1-continued

| Material | PMMA | Glass | Hybrid LGP |
|---|---|---|---|
| difference between the maximum and the minimum among the measured color coordinates Cx at 15*9 points | 0.0101 | 0.0088 | 0.0093 |
| difference between the maximum and the minimum among the measured color coordinates Cy at 15*9 points | 0.0147 | 0.0298 | 0.0236 |
| difference among the average values of color coordinates u' at 15*9 points | 0.0022 | 0.0036 | 0.0020 |
| difference among the average values of color coordinates v' at 15*9 points | 0.0060 | 0.0127 | 0.0067 |

In Table 1, the data in the column of PMMA are the values measured by the PMMA LGP; the data in the column of glass are the values measured by the glass LGP (such as Corning Gorilla 2319); the data in the column of hybrid LGP are the values measured by the hybrid LGP 134' adopted by the embodiment; P1-P13 are corresponding to the optical measuring positions P1-P13 in FIG. 9; Cx, Cy, u', and v' mean the color coordinates specified in CIE 1931, and delta u'v'(T) and delta u'v'(N) mean the chromatic aberration specified in CIE 1931; 15*9 points mean 135 points (i.e., 135 optical measuring positions) which are intersection points by 15 evenly-distributed vertical lines along the width W of the effective display region 137b and 9 evenly-distributed horizontal lines along the height H of the effective display region 137b. It can be seen that the optical characteristic of the hybrid LGP 134' in the embodiment is a compromised result of the optical characteristic of the PMMA LGP and the optical characteristic of the glass LGP.

Figure 10:
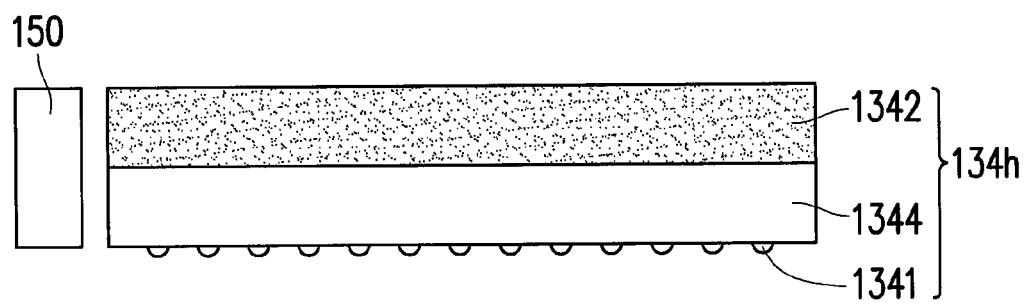
FIG. 10 is a cross-sectional diagram of a hybrid LGP and a light source according to another embodiment of the invention.

FIG. 10 is a cross-sectional diagram of a hybrid LGP and a light source according to another embodiment of the invention. Referring to FIG. 10, a hybrid LGP 134h is similar to the hybrid LGP 134' of FIG. 5B except that the second light guide sub-plate 1344 in FIG. 5B is disposed between the first light guide sub-plate 1342 and the light exiting surface 134d, while in the hybrid LGP 134h of the embodiment, the first light guide sub-plate 1342 is disposed between the second light guide sub-plate 1344 and the light exiting surface 134d. In addition, in the embodiment, the scattering microstructures 1341 are disposed on the second light guide sub-plate 1344. In another embodiment, the scattering microstructures 1341 are disposed both on the first light guide sub-plate 1342 and the second light guide sub-plate 1344.

Figure 11:
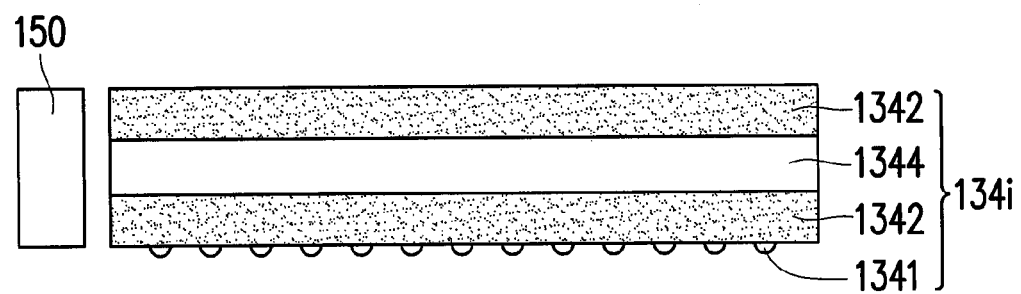
FIG. 11 is a cross-sectional diagram of a hybrid LGP and a light source according to yet another embodiment of the invention.

FIG. 11 is a cross-sectional diagram of a hybrid LGP and a light source according to yet another embodiment of the invention. Referring to FIG. 11, a hybrid LGP 134i is similar to the hybrid LGP 134' of FIG. 5B except that the hybrid LGP 134i of the embodiment has two first light guide sub-plates 1342 and a second light guide sub-plate 1344, in which the second light guide sub-plate 1344 is located between the two first light guide sub-plates 1342. In other embodiments however, the hybrid LGP could have a first light guide sub-plate 1342 and two second light guide sub-plates 1344, and the first light guide sub-plate 1342 is located between the two second light guide sub-plates 1344. Alternatively, in other embodiments, the hybrid LGP could have a plurality of first light guide sub-plates 1342 and a plurality of second light guide sub-plates 1344, and the first light guide sub-plates 1342 and the second light guide sub-plates 1344 could be stacked by each other in different sequence, for example, in alternate sequence; or in other embodiments, the hybrid LGP could include three or more light guide sub-plates made of different materials and the light guide sub-plates could be stacked by each other in different sequence. In this case, the hybrid LGP further includes at least one third light guide sub-plate which is bonded onto the first light guide sub-plate, the second light guide sub-plate or between the first light guide sub-plate and the second light guide sub-plate.

Figure 12:
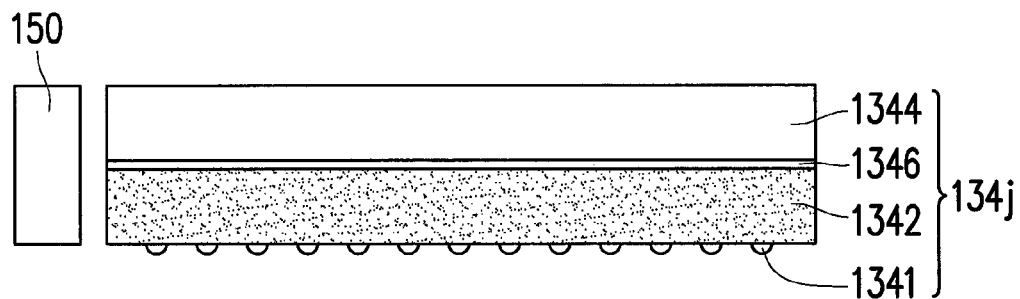
FIG. 12 is a cross-sectional diagram of a hybrid LGP and a light source according to yet another embodiment of the invention.

FIG. 12 is a cross-sectional diagram of a hybrid LGP and a light source according to yet another embodiment of the invention. Referring to FIG. 12, a hybrid LGP 134j is similar to the hybrid LGP 134' of FIG. 5B except that the hybrid LGP 134j further includes at least one transparent connection layer 1346 (only one transparent connection layer 1346 is given in FIG. 12 as an example), in which the transparent connection layer 1346 is connected between the first light guide sub-plates 1342 and the second light guide sub-plates 1344. In the embodiment, the transparent connection layer 1346 is for example, an optical clear adhesive (OCA) in optical grade or an optical clear acrylic adhesive. Both the OCA and the optical clear acrylic adhesive feature high transparency, high transmittance, high adhesion, resistance to high temperature and high humidity, and unlikely bubbling, and the thickness thereof depends on the situation, for example, it is less than 100 μm. In addition, the transparent connection layer 1346 could be adhered between the first light guide sub-plates 1342 and the second light guide sub-plates 1344 in tape form, and could be distributed between the first light guide sub-plates 1342 and the second light guide sub-plates 1344 in liquid form as well, followed by curing through heating or ultraviolet irradiation.

Figure 13:
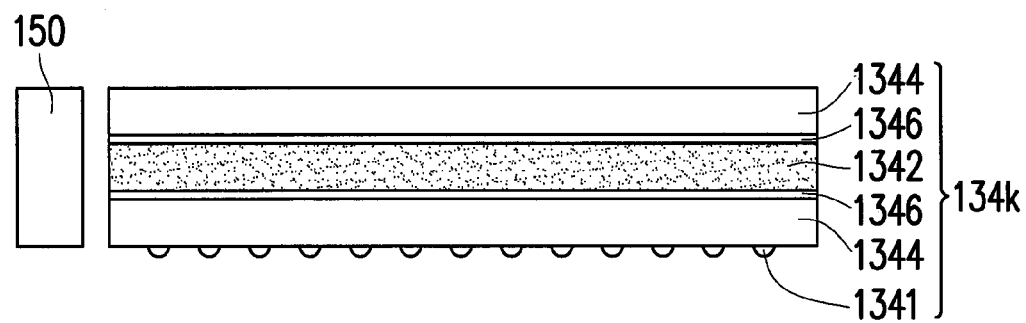
FIG. 13 is a cross-sectional diagram of a hybrid LGP and a light source according to yet another embodiment of the invention.

FIG. 13 is a cross-sectional diagram of a hybrid LGP and a light source according to yet another embodiment of the invention. Referring to FIG. 13, a hybrid LGP 134k is similar to the hybrid LGP 134i of FIG. 11 except that the first light guide sub-plates 1342 and the second light guide sub-plates 1344 are connected to each other through the transparent connection layer 1346 in the embodiment, while in FIG. 11, the first light guide sub-plates 1342 and the second light guide sub-plates 1344 are directly connected to each other and directly contact each other. In addition, in the hybrid LGP 134k of the embodiment, there are two second light guide sub-plates 1344 and one first light guide sub-plate 1342 in total, in which the first light guide sub-plate 1342 is located between the two second light guide sub-plates 1344, and accordingly, there are two transparent connection layers 1346 as well.

Figure 14:
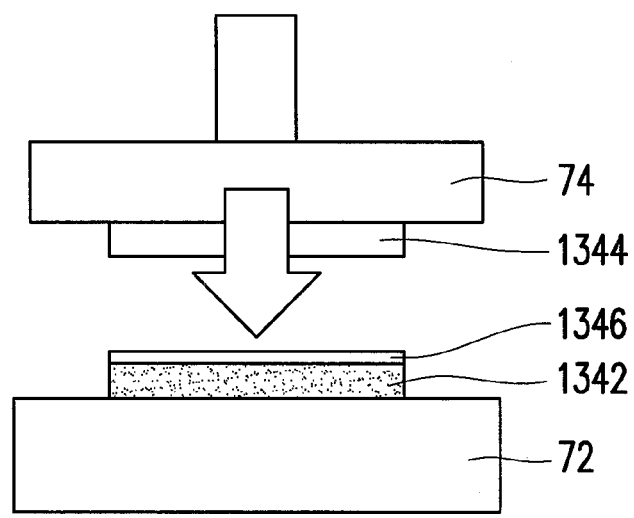
FIG. 14 is a schematic diagram of a process of the hybrid LGP of FIG. 5B.

FIG. 14 is a schematic diagram of a process of the hybrid LGP of FIG. 5B. Referring to FIG. 14, in order to affix the first light guide sub-plates 1342 and the second light guide sub-plates 1344 by each other, first, two adsorption platforms 72 and 74 are used to respectively adsorb the first light guide sub-plates 1342 and the second light guide sub-plates 1344, then the adsorption platforms 72 and 74 are used to press the first light guide sub-plates 1342 and the second light guide sub-plates 1344, so that the first light guide sub-plates 1342 and the second light guide sub-plates 1344 are affixed together through the transparent connection layer 1346.

Figure 15:
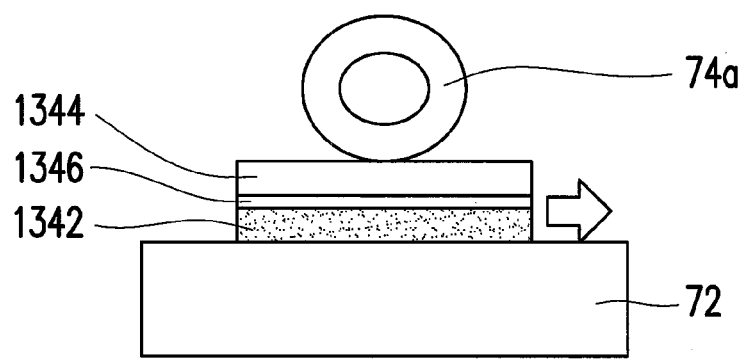
FIG. 15 is a schematic diagram of another process of the hybrid LGP of FIG. 5B.

FIG. 15 is a schematic diagram of another process of the hybrid LGP of FIG. 5B. Referring to FIG. 15, when the first light guide sub-plates 1342 and the second light guide sub-plates 1344 are affixed together, first, the first light guide sub-plate 1342 is placed on the adsorption platform 72, then the transparent connection layer 1346 and the second light guide sub-plate 1344 are placed on the first light guide sub-plate 1342, further a roller 74a is used to press-roll the second light guide sub-plate 1344, so that the first light guide sub-plate 1342 and the second light guide sub-plate 1344 are affixed together through the transparent connection layer 1346.

Figure 16:
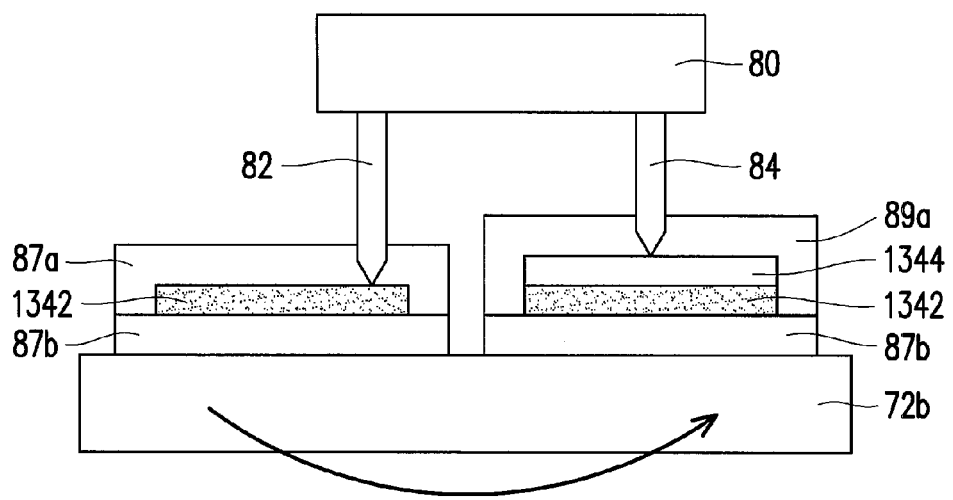
FIG. 16 is a schematic diagram of yet another process of the hybrid LGP of FIG. 5B.

FIG. 16 is a schematic diagram of yet another process of the hybrid LGP of FIG. 5B. Referring to FIG. 16, a mould 87b is placed on a moving or rotating platform 72b. Then, another mould 87a is used to cover the mould 87b. Further, a material of the first light guide sub-plate 1342 (such as glass) is poured into the moulds 87a and 87b from a material tank 80 via a first material-feeding tube 82. After curing the glass, the mould 87a is removed; then, the mould 87b is moved and rotated to another position; then, the mould 87a covers the first light guide sub-plate 1342 and the mould 87b. Moreover, a material of the second light guide sub-plate 1344 (such as PMMA) is poured into the moulds 87a and 87b from a material tank 80 via a second material-feeding tube 84. After the PMMA is cured, the first light guide sub-plate 1342 and the second light guide sub-plate 1344 bonded to the first light guide sub-plate 1342 are formed.

Figure 17:
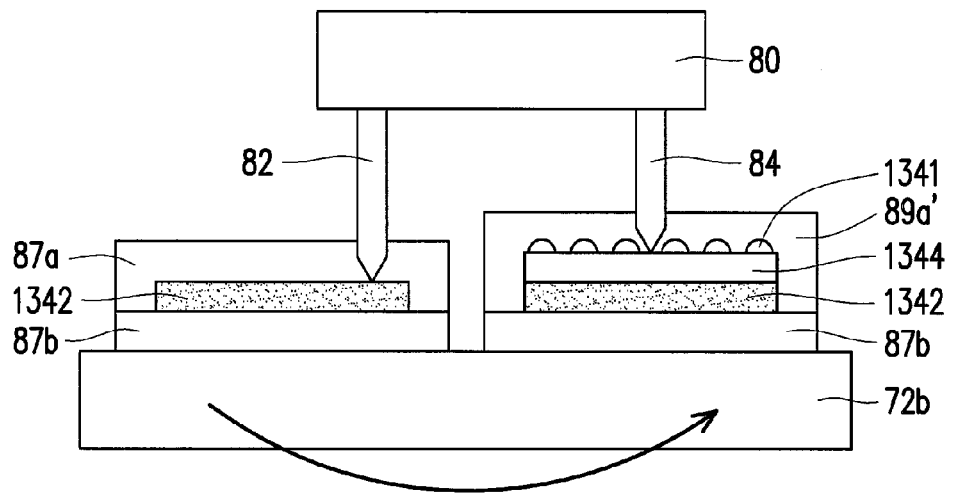
FIG. 17 is a diagram showing another variation of the process of the hybrid LGP in FIG. 16.

FIG. 17 is a diagram showing another variation of the process of the hybrid LGP in FIG. 16. Referring to FIG. 17, the embodiment is similar to the embodiment of FIG. 16 except that the inner surface of the mould 89a' in the embodiment has a pattern complementary to the scattering microstructures 1341 (for example, a recess). Thus, after an injection moulding for the second light guide sub-plate 1344 is finished, the scattering microstructures 1341 has been formed on the second light guide sub-plate 1344.

Figure 18:
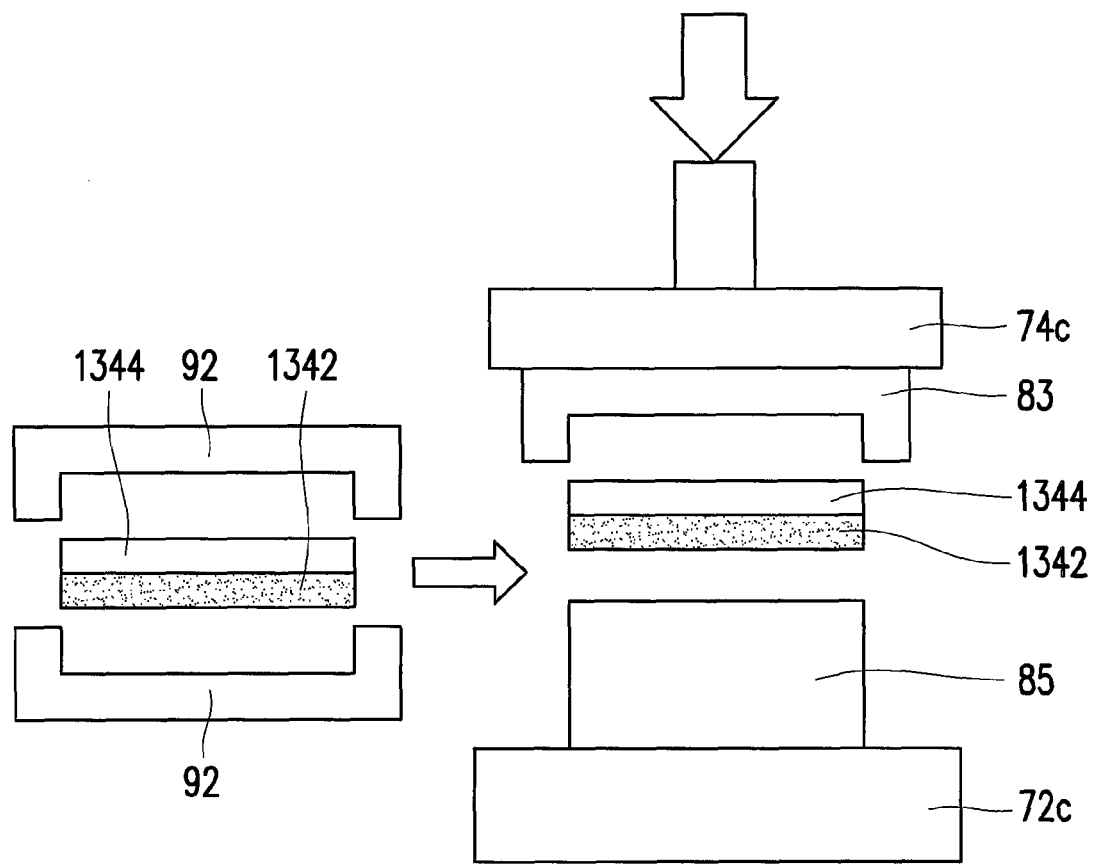
FIG. 18 is a schematic diagram of yet another process of the hybrid LGP of FIG. 5B.

FIG. 18 is a schematic diagram of yet another process of the hybrid LGP of FIG. 5B. Referring to FIG. 18, first, the first light guide sub-plate 1342 and the second light guide sub-plate 1344 are stacked by each other, and then, they are placed in a preheating furnace 92 to soften them. Further the softened first light guide sub-plate 1342 and second light guide sub-plate 1344 are placed between the moulds 83 and 85, followed by pressing the moulds 83 and 85 with the platform 72c and a fixture 74c to make the moulds 83 and 85 press the first light guide sub-plates 1342 and the second light guide sub-plates 1344. In this way, the first light guide sub-plate 1342 and the second light guide sub-plate 1344 are bonded to each other.

In addition, in the embodiments of FIGS. 16 and 17, prior to injection moulding the second light guide sub-plate 1344, a surface treatment or a spraying process of a surfactant is performed on the surface of the first light guide sub-plate 1342 where is preset to dispose the second light guide sub-plate 1344 on, so that after injection moulding the second light guide sub-plate 1344, the second light guide sub-plate 1344 could more closely bond the first light guide sub-plate 1342. In the same way, in the embodiment of FIG. 18, the surface treatment or the spraying process of a surfactant could be performed on the interface between the first light guide sub-plate 1342 and the second light guide sub-plate 1344. In addition, the forming sequence or the layout positions of the first light guide sub-plate 1342 and the second light guide sub-plate 1344 could be interchanged.

Figure 19A:
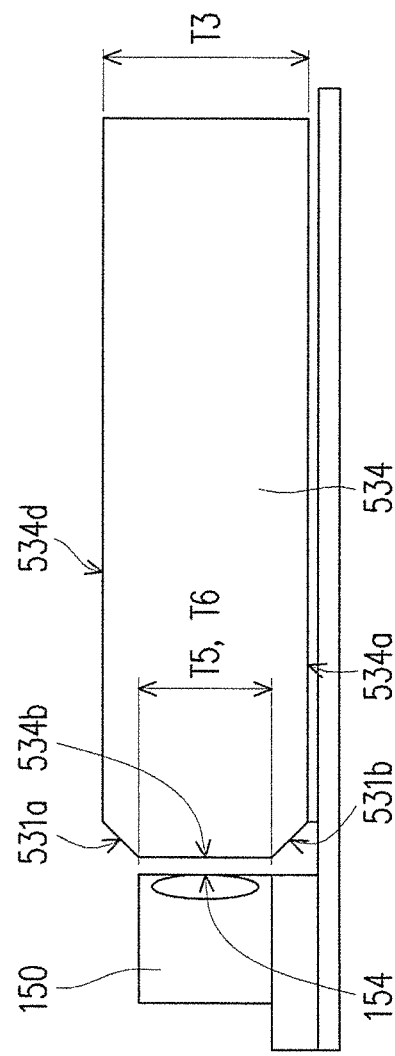
FIG. 19A is a cross-sectional diagram of a display device according to another embodiment of the invention.
Figure 19B:
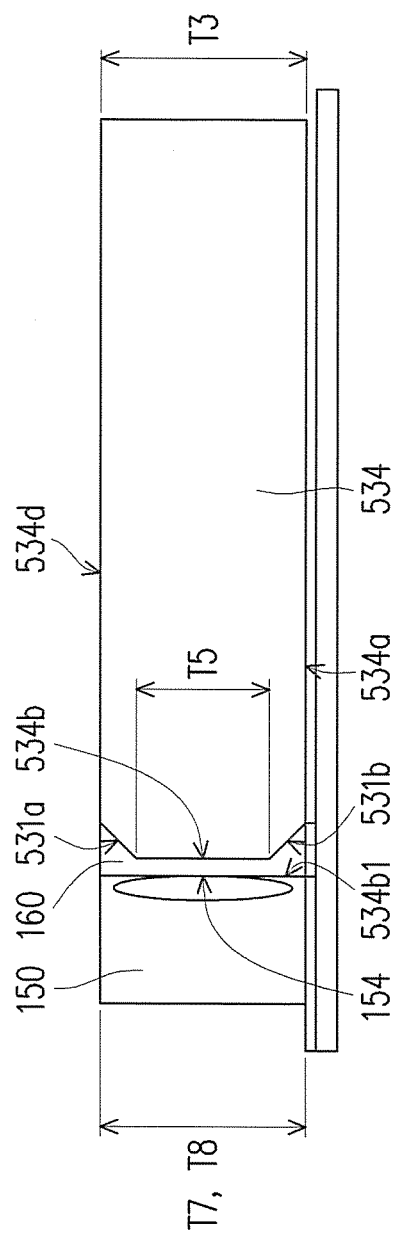
FIG. 19B is a cross-sectional diagram of a display device according to another embodiment of the invention.

FIG. 19A is a cross-sectional diagram of a display device according to another embodiment of the invention and FIG. 19B is a cross-sectional diagram of a display device according to another embodiment of the invention. To better understand, only some parts such as LGP 534 and the light source 150 are given in FIGS. 19A and 19B. Referring to FIGS. 19A and 19B, the light source 150 has a light-emitting surface 154. When the LGP 534 is made of glass, the edge of the LGP 534 has two chamfers 531a and 531b to avoid the crack or rupture problems with the LGP 534 made of the glass due to collision or stress concentration at the edge of the glass LGP 534. The chamfer 531*a* herein is connected to the light incidence side 534*b* and light exiting surface 534*d*. The other chamfer 531*b* is connected to the light incidence side 534*b* and the back surface 534*a*, and the chamfers 531*a* and 531*b* could be, for example, an inclined surface or an arc surface. Since the LGP 534 has two chamfers 531*a* and 531*b*, the thickness T5 of the light incidence side 534*b* gets smaller, i.e., the thickness T5 of the light incidence side 534*b* is less than the overall thickness T3 of the LGP 534. In order to make all the light beam 152 emitted from the light source 150 incident into the LGP 534 via the light incidence side 534*b* and avoid the light beam 152 from light-leaking or light loss at the chamfers 531*a* and 531*b*, the height T6 of the light-emitting surface 154 of the light source 150 should be roughly the same as the thickness T5 of the light incidence side 534*b* of the LGP 534. In FIG. 19B, an optical adhesive 160 is disposed, wherein the light-emitting surface 154 of the light source 150, the light incidence side 534*b* of the LGP 534, and the chamfers 531*a* and 531*b* are connected to each other by the optical adhesive 160 therebetween, so that no air gap between the light source 150 and the LGP 534. Since the space between the chamfers 531*a* and 531*b* of the LGP 534 is filled with the optical adhesive 160, and the two edges of the optical adhesive 160 at the chamfers 531*a* and 531*b* are flat with the light exiting surface 534*d* and the bottom surface 534*a*, so that the surface of the optical adhesive 160 connecting the light-emitting surface 154 of the light source 150 could be seen as a new light incidence side 534*b*1 of the LGP 534. The thickness T7 of the new light incidence side 534*b*1 is equivalent to the overall thickness T3 of the LGP 534. In other words, the thickness T5 of the light incidence side 534*b* of the LGP 534 is increased to the thickness T7 of the new light incidence side 534*b*1, where the area of the light incidence side gets larger so that a light source 150 with a larger light-emitting surface 154 could be employed to make the height T8 of the light-emitting surface 154 of the light source 150 roughly the same as the thickness T7 of the new light incidence side 534*b*1 of the LGP 534, which increases the light flux of the light beam 152 incident into the LGP 534.

Figure 20:
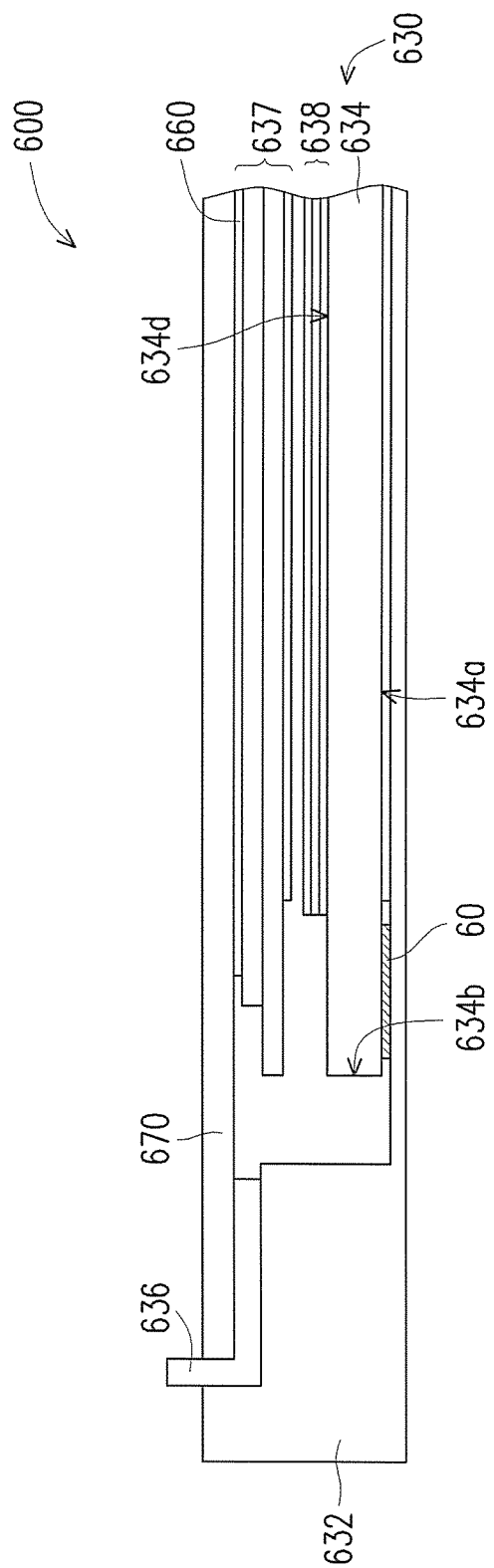
FIG. 20 is a cross-sectional diagram of a display device according to another embodiment of the invention.

FIG. 20 is a cross-sectional diagram of a display device according to another embodiment of the invention. A display device 600 of the embodiment includes a transparent plate 670 and a display module 630. The display module 630 includes a back cover 632, an LGP 634, a support element 636, a display panel 637, and an optical film set 638. The LGP 634 is supported on the back cover 632, the support element 636 is supported on the back cover 632 and disposed between the transparent plate 670 and the back cover 632, and the support element 636 could be an elastic buffer material such as rubber or elastic double-sided adhesive. The display panel 637 and the transparent plate 670 are connected through an optical adhesive 660, the transparent plate 670 is disposed on the back cover 632 and bonded to the back cover 632 through the support element 636, in which the transparent plate 670 could be a glass plate or a touch module. In other words, the display panel 637 is adhered to the transparent plate 670 and supported on the back cover 632 through the transparent plate 670, so that the display panel 637 is not supported on the other components, i.e., the display panel 637 is not directly supported on the other components, but hangs from the back cover 632. The optical film set 638 is disposed between the display panel 637 and the LGP 634. The LGP 634 has a light exiting surface 634*d* and a back surface 634*a* opposite to the light exiting surface 634*d*, wherein the back surfaces 634*a* of the LGP 634 adjacent to the sides (the other sides rather than the light incidence side 634*b*) are respectively adhered to the back cover 632 through a plurality of double-sided adhesives 60.

In addition, the LGP 634 in the embodiment of FIG. 20, as the description of the embodiments in FIGS. 3A-13, could be a glass LGP or a hybrid LGP, which is omitted to describe. When the LGP 634 is a hybrid LGP, in an embodiment, the material of the first light guide sub-plate could be glass and the material of the second light guide sub-plate could be plastic. In other embodiments, the LGP 634 is a hybrid LGP, the material of the first light guide sub-plate could be PMMA and the material of the second light guide sub-plate could be polycarbonate (PC), which the invention is not limited to.

Under the above-mentioned layout, the back cover 632 of the display module 630 and the transparent plate 670 of the display device 600 are combined to become an appearance piece, and the back cover 632 and the transparent plate 670 enclose the LGP 634 (or the hybrid LGP), the support element 636, the display panel 637, and the optical film set 638. As a result, a rear housing is not necessarily disposed behind the back surface of the display module 630 in the display device 600 so that the overall thickness of the display device 600 is reduced. In addition, the housing 110, the front frame 110*a*, and the frame 120 in FIGS. 3A-13 could be omitted in the display device 600. In this case, the transparent plate 670 provides the function of the housing 100, the back cover 632 provides the functions of the front frame 110*a* and the frame 120, which saves the assembling, the procedures, and the cost.

In summary, the embodiments of the invention have at least one of the following advantages. The back cover of the display module and the housing of the display device are combined to become an appearance piece, or the back cover of the display module and the transparent plate of the display device are combined to become an appearance piece, so that the display device could reduce the thickness thereof without disposing a rear housing behind the back surface of the display device and it could be avoided that the display module is pressed due to the warping of the rear cover. The design that the back cover of the display module and the transparent plate of the display device are combined to become an appearance piece can also save the assembling, the procedures, and the cost. In addition, the LGP and the first light guide sub-plate are made of glass to serve as a major part in the display device to increase the structural strength. At the time, when the back cover of the display module is applied by an external force to press the LGP or the hybrid LGP, the LGP or the hybrid LGP with better structural strength could withstand the force coming from the back cover without getting deformed or damaged. Therefore, it is no need to reserve a larger gap between the back cover and the LGP (hybrid LGP) to avoid the LGP or the hybrid LGP from being pressed by the back cover, which further reduces the thickness of the display device. In addition, the reinforced glass adopted by the LGP and the first light guide sub-plate are unlikely to be expanded as heating or adsorbing moisture, thus, the sides of the LGP or the hybrid LGP could be all adhered to the back cover to make the LGP (hybrid LGP) and the back cover more closely bonded together to enhance the whole structural strength of the display device.

In addition, the hybrid LGP in the embodiments of the invention includes at least two light guide sub-plates of different materials to have good mechanical strength and good optical characteristic, so that the hybrid LGP in the embodiments of the invention has broader adaptations to meet more application needs.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

In addition, the ordinal numbers prior to some elements, such as first, second and the like, are used to represent the names of the elements or to distinguish different embodiment or scopes only, not to restricts the upper limit or lower limit of the quantity of the elements.

What is claimed is:
1. A display device, comprising:
   a housing;
   a frame, bonded to the housing; and
   a display module, comprising:
      a back cover, bonded to the frame;
      a light guide plate, supported on the back cover and having a light exiting surface and a back surface opposite to the light exiting surface, wherein at least two sides of the back surface of the light guide plate are adhered on the back cover, and a material of the light guide plate is glass;
      a support element, supported and rested on the light guide plate;
      a display panel, supported on the support element; and
      an optical film set, disposed between the display panel and the light guide plate,
   wherein the frame has a side surface and the entire side surface of the frame exposes to outside, and the housing, the frame and the back cover are combined to become an appearance of the display device,
   wherein the display panel has a display surface and an effective display region, a reference line extends from a boundary of the effective display region on the display surface to outside the effective display region, the reference line is perpendicular to the boundary, an included angle between the reference line and a normal direction of the effective display region is 45°, and an end of the light guide plate extends out of the effective display region and across the reference line.

2. The display device as claimed in claim 1, wherein the housing and the back cover enclose the light guide plate, the support element, the display panel, and the optical film set.

3. The display device as claimed in claim 1, wherein the housing is a front frame and exposes the display surface of the display panel.

4. The display device as claimed in claim 1, wherein Young's modulus of the back cover is greater than 40 Gpa.

5. The display device as claimed in claim 1, wherein a thickness of the back cover is less than 0.5 mm.

6. The display device as claimed in claim 1, wherein a gap between the back cover and the light guide plate is less than 0.1 mm.

7. The display device as claimed in claim 1, wherein Young's modulus of the light guide plate is greater than 40 Gpa.

8. The display device as claimed in claim 1, wherein the support element has a recess, and the end of the light guide plate extends into the recess and supports the support element.

9. The display device as claimed in claim 1, wherein the support element has a slot having a through passage extending in a direction parallel to the light exiting surface, and the end of the light guide plate goes into and through the through passage and supports the support element.

10. The display device as claimed in claim 1, further comprising a plurality of conductive wires, wherein the conductive wires are disposed on the frame.

11. The display device as claimed in claim 1, wherein a thickness of the display device is less than 4 mm.

12. The display device as claimed in claim 1, further comprising a light source, wherein the light source is disposed on the back cover and adjacent to a light incidence side of the light guide plate.

13. The display device as claimed in claim 12, wherein the light source has a light-emitting surface, the light guide plate has two chamfers, one of the chamfers is connected to the light incidence side and the light exiting surface, the other chamfer is connected to the light incidence side and the back surface, and a height of the light-emitting surface of the light source is the same as a height of the light incidence side of the light guide plate.

14. The display device as claimed in claim 13, further comprising an optical adhesive, wherein the light-emitting surface of the light source, the light incidence side of the light guide plate, and the chamfers are connected to each other through the optical adhesive.

15. The display device as claimed in claim 1, wherein a reflective sheet is disposed under the back surface of the light guide plate.

16. The display device as claimed in claim 1, wherein the support element is an elastic buffer material.

17. A display device, comprising:
a housing;
a frame, bonded to the housing; and
a display module, comprising:
- a back cover, bonded to the frame;
- a hybrid light guide plate, supported on the back cover and having a light exiting surface and a back surface opposite to the light exiting surface, wherein at least two sides of the back surface of the hybrid light guide plate are adhered on the back cover, and a material of the hybrid light guide plate comprises glass;
- a support element, supported and rested on the hybrid light guide plate;
- a display panel, supported on the support element; and
- an optical film set, disposed between the display panel and the hybrid light guide plate, wherein the frame has a side surface and the entire side surface of the frame exposes to outside, and the housing, the frame and the back cover are combined to become an appearance of the display device, wherein the display panel has a display surface and an effective display region, a reference line extends from a boundary of the effective display region on the display surface to outside the effective display region, the reference line is perpendicular to the boundary, an included angle between the reference line and a normal direction of the effective display region is 45°, and an end of the light guide plate extends out of the effective display region and across the reference line.

18. The display device as claimed in claim 17, further comprising a reflective sheet disposed between the back surface and the back cover, wherein the reflective sheet is supported on the back cover and the hybrid light guide plate is supported on the reflective sheet.

19. The display device as claimed in claim 17, wherein the hybrid light guide plate comprises at least one first light guide sub-plate and at least one second light guide sub-plate, and ratio of thickness of the first light guide sub-plate over thickness of the second light guide sub-plate falls within a range greater than or equal to 0.2 and less than or equal to 5.

20. The display device as claimed in claim 17, wherein a thickness of the hybrid light guide plate is greater than or equal to a thickness of the back cover.

21. The display device as claimed in claim 20, wherein the thickness of the hybrid light guide plate falls within a range greater than or equal to 0.2 mm and less than or equal to 3 mm and the thickness of the back cover falls within a range greater than or equal to 0.1 mm and less than or equal to 3 mm.

22. A display device, comprising:
a transparent plate; and
a display module, comprising:
- a back cover, bonded to the transparent plate;
- a light guide plate, supported on the back cover and having a light exiting surface and a back surface opposite to the light exiting surface, wherein at least two sides of the back surface of the light guide plate are adhered on the back cover, and a material of the light guide plate comprises glass;
- a support element, supported on the back cover and disposed between the transparent plate and the back cover;
- a display panel, connected to the transparent plate through an optical adhesive, wherein the support element is outside sides of the display panel and free from directly supporting the display panel; and
- an optical film set, disposed between the display panel and the light guide plate, wherein the back cover has a side surface and a bottom surface, the entire side surface of the back cover exposes to outside, and the back cover and the transparent plate are combined to become an appearance of the display device.

23. The display device as claimed in claim 22, wherein the transparent plate and the back cover enclose the light guide plate, the support element, the display panel, and the optical film set.

24. The display device as claimed in claim 22, wherein the light guide plate is a hybrid light guide plate.

25. The display device as claimed in claim 24, wherein the hybrid light guide plate has at least one first light guide sub-plate and at least one second light guide sub-plate, the second light guide sub-plate is stacked on the first light guide sub-plate and bonded to the first light guide sub-plate, wherein material of the first light guide sub-plate is glass and material of the second light guide sub-plate is plastic.

26. The display device as claimed in claim 24, wherein the hybrid light guide plate has at least one first light guide sub-plate and at least one second light guide sub-plate, the second light guide sub-plate is stacked on the first light guide sub-plate and bonded to the first light guide sub-plate, wherein material of the first light guide sub-plate is polymethylmethacrylate (PMMA) and material of the second light guide sub-plate is polycarbonate (PC).

* * * * *